(12) United States Patent
Ishiga et al.

(10) Patent No.: US 7,289,665 B2
(45) Date of Patent: Oct. 30, 2007

(54) IMAGE PROCESSING DEVICE AND IMAGE PROCESSING PROGRAM

(75) Inventors: Kenichi Ishiga, Yokohama (JP); Zhe-Hong Chen, Tokyo (JP)

(73) Assignee: Nikon Corporation, Tokyo (JP)

( * ) Notice: Subject to any disclaimer, the term of this patent is extended or adjusted under 35 U.S.C. 154(b) by 690 days.

(21) Appl. No.: 10/469,939

(22) PCT Filed: Feb. 28, 2002

(86) PCT No.: PCT/JP02/01860

§ 371 (c)(1),
(2), (4) Date: Sep. 16, 2003

(87) PCT Pub. No.: WO02/071761

PCT Pub. Date: Sep. 12, 2002

(65) Prior Publication Data

US 2005/0073591 A1    Apr. 7, 2005

(30) Foreign Application Priority Data

Mar. 5, 2001 (JP) ............................. 2001-060215

(51) Int. Cl.
*G06K 9/00* (2006.01)
(52) U.S. Cl. .................................... 382/167
(58) Field of Classification Search ................ 382/162, 382/164–167, 260–261, 270–274; 348/645, 348/649, 655; 358/518–520
See application file for complete search history.

(56) References Cited

U.S. PATENT DOCUMENTS 4,937,662 A * 6/1990 Matsunawa et al. ........ 358/538
4,996,591 A * 2/1991 Kadowaki et al. .......... 358/519
5,506,619 A   4/1996 Adams, Jr. et al.
5,534,919 A   7/1996 Nobuoka
5,552,827 A * 9/1996 Maenaka et al. ........... 348/266
5,614,947 A   3/1997 Tanizoe et al.

(Continued)

FOREIGN PATENT DOCUMENTS

CN     1300505 A     6/2001

(Continued)

OTHER PUBLICATIONS

Chang E. et. al, "Color filter array recovery using a threshold-based variable number of gradients", Proceedings of the SPIE, SPIE, Bellingham, VA, vol. 3650, Jan. 27, 1999, pp. 36-43.

(Continued)

*Primary Examiner*—Jose L. Couso
(74) *Attorney, Agent, or Firm*—Oliff & Berridge, PLC

(57) ABSTRACT

An image processing unit of the present invention receives a first image, performs weighted addition on color information in the first image to generate a color component different from that of the color information in the first image, and outputs the generated color component as a second image. The first image is expressed in a plurality of color components and comprises a plurality of pixels each having color information corresponding to one of the color components. At least nine coefficient patterns consisting of values of not less than zero are prepared, and any one of the coefficient patterns is used for weighted addition. This allows an improvement in image quality with high precision.

38 Claims, 14 Drawing Sheets

U.S. PATENT DOCUMENTS

| | | | |
|---|---|---|---|
| 5,652,621 A | 7/1997 | Adams, Jr. et al. | |
| 5,703,641 A | 12/1997 | Watanabe | |
| 5,901,242 A | 5/1999 | Crane et al. | |
| 6,075,889 A | 6/2000 | Hamilton, Jr. et al. | |
| 6,075,899 A | 6/2000 | Yoshioka et al. | |
| 6,356,276 B1 | 3/2002 | Acharya | |
| 6,487,309 B1 * | 11/2002 | Chen | 382/162 |
| 6,714,242 B1 | 3/2004 | Kobayashi | |
| 6,809,765 B1 | 10/2004 | Tao | |
| 6,836,572 B2 * | 12/2004 | Ishiga et al. | 382/300 |
| 6,882,364 B1 | 4/2005 | Inuiya et al. | |
| 7,146,042 B2 * | 12/2006 | Chen | 382/167 |
| 2001/0016083 A1 | 8/2001 | Hayashi et al. | |
| 2002/0001409 A1 | 1/2002 | Chen et al. | |

FOREIGN PATENT DOCUMENTS

| | | |
|---|---|---|
| DE | 694 20 469 T2 | 12/1994 |
| EP | 0 630 159 A1 | 12/1994 |
| EP | 0 964 585 A2 | 12/1999 |
| JP | A 7-7736 | 1/1995 |
| JP | A 7-107496 | 4/1995 |
| JP | A 7-203465 | 8/1995 |
| JP | A 10-257506 | 9/1998 |
| JP | A-11-177994 | 7/1999 |
| JP | A-2000-184386 | 6/2000 |
| JP | A 2000-197067 | 7/2000 |
| JP | A 2000-341701 | 12/2000 |
| JP | A 2001-61157 | 3/2001 |
| JP | A 2000-245314 | 9/2001 |
| KR | 0146260 | 5/1998 |
| TW | 420956 | 2/2001 |
| WO | WO99/59345 | 11/1999 |
| WO | WO 02/21849 A1 | 3/2002 |

OTHER PUBLICATIONS

Kimmel R., "Demosaicing: image reconstruction from color CCD samples", IEEE Transactions on Image Processing, IEEE Service Center, Piscataway, NJ, vol. 8, No. 9, Sep. 1999, pp. 1221-1228.

Cai C et al, "Saturation-based adaptive inverse gradient interpolation for Bayer pattern images" IEE Proceedings: Visin, Imnage and Signal Processing, Institution of Electrical Engineers, GB, vol. 148, No. 3, Jun. 22, 2001, pp. 202-208.

* cited by examiner

FIG. 2

(1) R POSITION

| COORDINATES [i, j] | i-2 | i-1 | i | i+1 | i+2 |
|---|---|---|---|---|---|
| j-2 | R | G | R | G | R |
| j-1 | G | B | G | B | G |
| j | R | G | R | G | R |
| j+1 | G | B | G | B | G |
| j+2 | R | G | R | G | R |

(2) B POSITION

| COORDINATES [i, j] | i-2 | i-1 | i | i+1 | i+2 |
|---|---|---|---|---|---|
| j-2 | B | G | B | G | B |
| j-1 | G | R | G | R | G |
| j | B | G | B | G | B |
| j+1 | G | R | G | R | G |
| j+2 | B | G | B | G | B |

(3) G POSITION

| COORDINATES [i, j] | i-2 | i-1 | i | i+1 | i+2 |
|---|---|---|---|---|---|
| j-2 | G | R | G | R | G |
| j-1 | B | G | B | G | B |
| j | G | R | G | R | G |
| j+1 | B | G | B | G | B |
| j+2 | G | R | G | R | G |

| COORDINATES [i, j] | i-2 | i-1 | i | i+1 | i+2 |
|---|---|---|---|---|---|
| j-2 | G | B | G | B | G |
| j-1 | R | G | R | G | R |
| j | G | B | G | B | G |
| j+1 | R | G | R | G | R |
| j+2 | G | B | G | B | G |

FIG. 7

|  | i-2 | i-1 | i | i+1 | i+2 |
|---|---|---|---|---|---|
| j-2 |  |  | 1 |  |  |
| j-1 |  | 2 |  | 2 |  |
| j | 1 |  | 4 |  | 1 |
| j+1 |  | 2 |  | 2 |  |
| j+2 |  |  | 1 |  |  |

| | $\alpha u_1$ | $\beta t_1/2$ |
|---|---|---|
| | $\beta/2$ | |
| $\beta t_2/2$ | $\alpha u_2$ | |

COEFFICIENT PATTERN 5

| $\beta s_1/4$ | $\alpha u_1$ | $\beta t_1/4$ |
|---|---|---|
| | $\beta/2$ | |
| $\beta t_2/4$ | $\alpha u_2$ | $\beta s_2/4$ |

COEFFICIENT PATTERN 4

| $\beta s_1/2$ | $\alpha u_1$ | |
|---|---|---|
| | $\beta/2$ | |
| | $\alpha u_2$ | $\beta s_2/2$ |

COEFFICIENT PATTERN 6

| | $\alpha u_1/2$ | $\beta t_1/2$ |
|---|---|---|
| $\alpha v_1/2$ | $\beta/2$ | $\alpha v_2/2$ |
| $\beta t_2/2$ | $\alpha u_2/2$ | |

COEFFICIENT PATTERN 2

| $\beta s_1/4$ | $\alpha u_1/2$ | $\beta t_1/4$ |
|---|---|---|
| $\alpha v_1/2$ | $\beta/2$ | $\alpha v_2/2$ |
| $\beta t_2/4$ | $\alpha u_2/2$ | $\beta s_2/4$ |

COEFFICIENT PATTERN 1

| $\beta s_1/2$ | $\alpha u_1/2$ | |
|---|---|---|
| $\alpha v_1/2$ | $\beta/2$ | $\alpha v_2/2$ |
| | $\alpha u_2/2$ | $\beta s_2/2$ |

COEFFICIENT PATTERN 3

| | | $\beta t_1/2$ |
|---|---|---|
| $\alpha v_1$ | $\beta/2$ | $\alpha v_2$ |
| $\beta t_2/2$ | | |

COEFFICIENT PATTERN 8

| $\beta s_1/4$ | | $\beta t_1/4$ |
|---|---|---|
| $\alpha v_1$ | $\beta/2$ | $\alpha v_2$ |
| $\beta t_2/4$ | | $\beta s_2/4$ |

COEFFICIENT PATTERN 7

| $\beta s_1/2$ | | |
|---|---|---|
| $\alpha v_1$ | $\beta/2$ | $\alpha v_2$ |
| | | $\beta s_2/2$ |

COEFFICIENT PATTERN 9

| | $\beta/4$ | |
|---|---|---|
| $\beta/4$ | $\alpha$ | $\beta/4$ |
| | $\beta/4$ | |

COEFFICIENT PATTERN 10

| $\alpha d_1$ | $\beta/4$ | |
|---|---|---|
| $\beta/4$ | $\alpha d_2$ | $\beta/4$ |
| $\alpha d_3$ | $\beta/4$ | |

COEFFICIENT PATTERN 0

FIG. 11

|     | i-1 | i  | i+1 |
|-----|-----|----|-----|
| j-1 | -1  | -1 | -1  |
| j   | -1  | 8  | -1  |
| j+1 | -1  | -1 | -1  |

|     | i-1 | i  | i+1 |
|-----|-----|----|-----|
| j-1 |     | -2 |     |
| j   |     | 4  |     |
| j+1 |     | -2 |     |

/4

(1) COEFFICIENT PATTERN 11

|     | i-1 | i  | i+1 |
|-----|-----|----|-----|
| j-1 |     |    |     |
| j   | -2  | 4  | -2  |
| j+1 |     |    |     |

/4

(2) COEFFICIENT PATTERN 12

|     | i-1 | i  | i+1 |
|-----|-----|----|-----|
| j-1 |     | -1 |     |
| j   | -1  | 4  | -1  |
| j+1 |     | -1 |     |

/4

(3) COEFFICIENT PATTERN 13

FIG. 13

(1) COEFFICIENT PATTERN 11

|   | i-2 | i-1 | i | i+1 | i+2 |
|---|---|---|---|---|---|
| j-2 |  |  | 2 |  |  |
| j-1 |  |  | -4 |  |  |
| j |  |  | 4 |  |  | /8
| j+1 |  |  | -4 |  |  |
| j-2 |  |  | 2 |  |  |

(2) COEFFICIENT PATTERN 12

|   | i-2 | i-1 | i | i+1 | i+2 |
|---|---|---|---|---|---|
| j-2 |  |  |  |  |  |
| j-1 |  |  |  |  |  |
| j | 2 | -4 | 4 | -4 | 2 | /8
| j+1 |  |  |  |  |  |
| j-2 |  |  |  |  |  |

(3) COEFFICIENT PATTERN 13

|   | i-2 | i-1 | i | i+1 | i+2 |
|---|---|---|---|---|---|
| j-2 |  |  | 1 |  |  |
| j-1 |  |  | -2 |  |  |
| j | 1 | -2 | 4 | -2 | 1 | /8
| j+1 |  |  | -2 |  |  |
| j-2 |  |  | 1 |  |  |

FIG. 14

|   | i-1 | i | i+1 |
|---|---|---|---|
| j-1 | 1 | 2 | 1 |
| j | 2 | 4 | 2 |
| j+1 | 1 | 2 | 1 |

|   | i-2 | i-1 | i | i+1 | i+2 |
|---|---|---|---|---|---|
| j-2 | 1 | 4 | 6 | 4 | 1 |
| j-1 | 4 | 16 | 24 | 16 | 4 |
| j | 6 | 24 | 36 | 24 | 6 |
| j+1 | 4 | 16 | 24 | 16 | 4 |
| j-2 | 1 | 4 | 6 | 4 | 1 |

/64

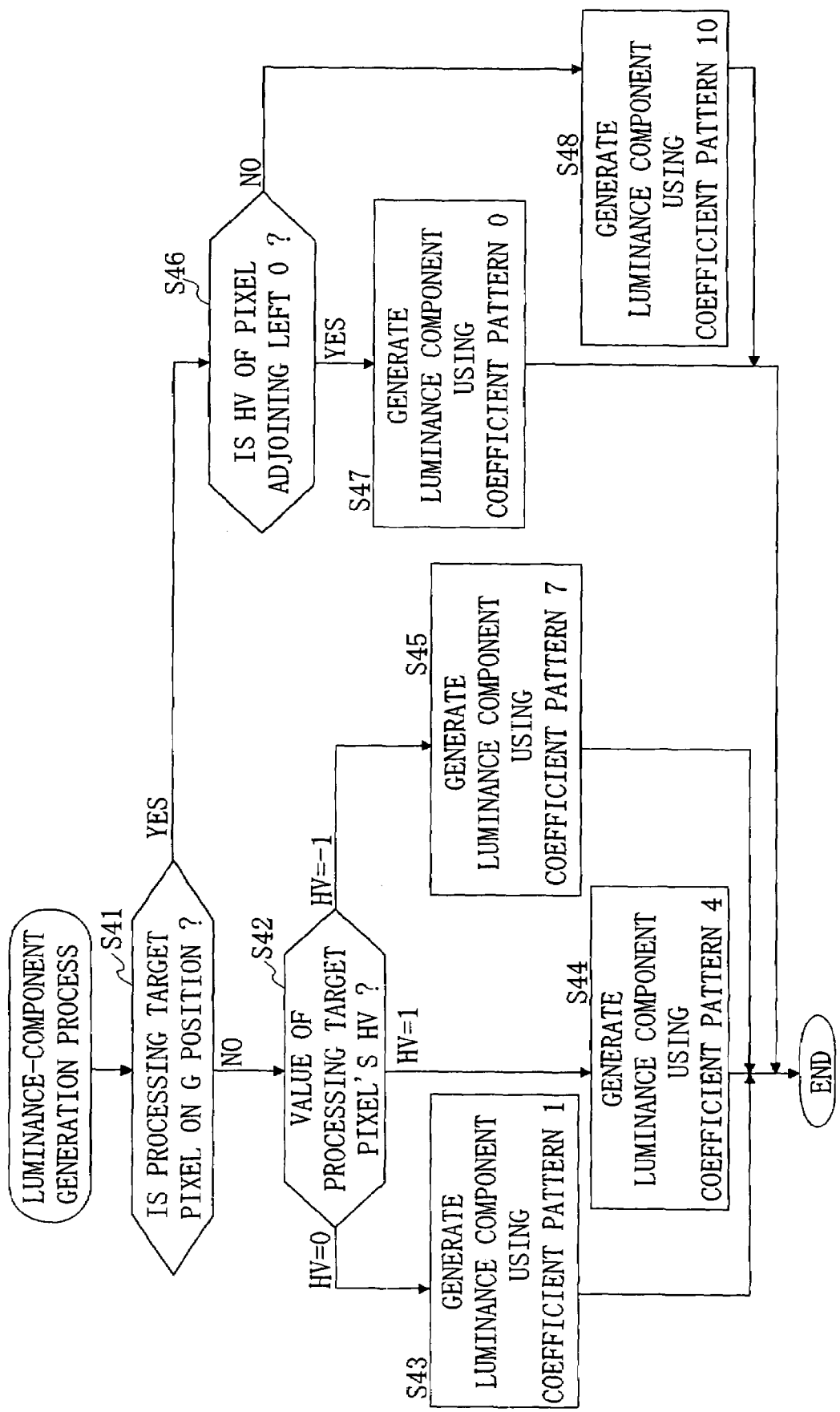

IMAGE PROCESSING DEVICE AND IMAGE PROCESSING PROGRAM

TECHNICAL FIELD

The present invention relates to an image processing apparatus for enhancing an image that is expressed in a plurality of color components and comprises a plurality of pixels each having color information corresponding to one of the color components. The present invention also relates to an image processing program for making a computer enhance an image that is expressed in a plurality of color components and consists of a plurality of pixels each having color information corresponding to one of the color components.

BACKGROUND ART

Some electronic cameras generate color image data by using an image sensor on which color filters in three colors (R, G, B: red, green, blue) are arranged on predetermined positions (such as in a Bayer array).

In this kind of electronic cameras, each of the pixels of the image sensor outputs color information on a single color component alone. Thus, processes for enhancing the image by providing each pixel with color information corresponding to three color components have been practiced.

Among such processes heretofore practiced is a color interpolation process. Specifically, similarity of each pixel in conjunction with the directions to its adjacent pixels is judged, and interpolation values (values that are equivalent to the color information corresponding to color components not contained in respective pixels) are obtained in accordance with the judgement result.

Moreover, Japanese Unexamined Patent Application Publication No. 2000-78597 (U.S. Pat. No. 6,075,889) discloses technology for performing a process of generating a luminance value and a "chrominance value" for each pixel. That is, enhancement of an image is achieved through the processing in which each pixel is provided with the color components of a colorimetric system different from the colorimetric system that was adopted in the image at the time of generation by the image sensor. Here, the luminance values of the respective pixels are generated, being classified into five similarity directions, which are a horizontal direction, vertical direction, flat, diagonal direction 1, and diagonal direction 2.

According to the technology disclosed in the foregoing publication, however, luminance values are basically generated from color information corresponding to two color components, as is evident from how the luminance values of pixels containing color information corresponding to the red component or color information corresponding to the blue component are generated. Consequently, the luminance values generated at the respective pixels become uneven in RGB ratios pixel by pixel, and the RGB ratios of the generated luminance values vary greatly each time the target pixel of the luminance value generation moves on. Thus, there has been a high possibility that false structures not existing in the photographic object (false structures attributable to the Bayer array) appear as structures varying pixel by pixel over chromatic areas and flat areas in particular.

Moreover, according to the technology disclosed in the foregoing publication, the generated luminance values are corrected with correction values which vary depending on the directions of similarity at the respective pixels. Such correction values are extracted from "blurred luminance values" whose high frequency components pertaining to structural factors are all broken. Hence, the high frequency components have been corrected only insufficiently, with the results lacking in high frequency components.

Furthermore, according to the technology disclosed in the foregoing publication, since chrominance is generated with reference to luminance values that are generated from color information over a wide range, local high frequency components tend to disappear and color artifacts easily occur.

That is, it has been impossible to expect image enhancement with high precision from the technology disclosed in the foregoing publication.

DISCLOSURE OF THE INVENTION

It is an object of the present invention to provide an image processing apparatus which can achieve a high-precision enhancement of an image that is expressed in a plurality of color components and consists of a plurality of pixels each having color information corresponding to one of the color components.

Another object of the present invention is to provide an image processing program which can achieve, by using a computer, a high-precision enhancement of an image that is expressed in a plurality of color components and consists of a plurality of pixels each having color information corresponding to one of the color components.

Hereinafter, the subject matter of the present invention will be described below.

According to another aspect of the present invention, in the image processing unit, levels of similarity along a plurality of directions are determined, and which to use from the at least nine coefficient patterns is selected in accordance with the determined result.

According to another aspect of the present invention, in the image processing unit, at least nine coefficient patterns are prepared for performing weighted addition on color information present at a target pixel in the first image and color information present at pixels adjoining the target pixel.

According to another aspect of the present invention, in the image processing unit, when the first image is expressed in a first color component set with a higher pixel density and second and third color components set with a lower pixel density, weighted addition on a pixel having the first color component is performed by using a coefficient pattern prepared separately from the at least nine coefficient patterns.

(4) According to another image processing apparatus of the present invention as set forth in (1), in the image processing unit, when the first image is expressed in a first color component set with a higher pixel density and second and third color components set with a lower pixel density, weighted addition on a pixel having the first color component is performed by using a coefficient pattern prepared separately from the at least nine coefficient patterns.

According to another aspect of the present invention, in the image processing unit, levels of similarity along a plurality of directions are determined, for a pixel having the second or third color component and adjacent to pixels having the first color component. When the levels of similarity are indistinguishable along any direction, a coefficient pattern including weighted addition on color information present at a plurality of pixels having the first color component is used as the coefficient pattern prepared separately.

According to another aspect of the present invention, in the image processing unit, at the time of the weighted addition, a coefficient pattern including weighted addition on color information present at a target pixel and color information present at the pixels having the first color component and lying the closest to the target pixel is used, as the coefficient pattern including the weighted addition on the color information present at the plurality of pixels having the first color component.

(7) Another image processing apparatus according to the present invention includes an image processing unit for receiving a first image, performing weighted addition on color information in the first image by using variable coefficients of not less than zero to generate a color component different from that of the color information in the first image, and outputting the generated color component as a second image. The first image is expressed in a plurality of color components and comprises a plurality of pixels each having color information corresponding to one of the color components. In the image processing unit, weighted addition on color information present at a target pixel in the first image and color information present at pixels adjoining the target pixel is performed.

According to another aspect of the present invention, in the image processing unit, levels of similarity along a plurality of directions are determined, and the coefficients of the weighted addition are changed in accordance with the determined result.

(9) Another image processing apparatus according to the present invention includes an image processing unit for receiving a first image, performing weighted addition on color information in the first image by using variable coefficients of not less than zero to generate a color component different from that of the color information in the first image, and outputting the generated color component as a second image. The first image is expressed in three or more types of color components and comprises a plurality of pixels each having color information corresponding to one of the color components. In the image processing unit, weighted addition on color information corresponding to at least three types of color components in the first image is performed over all the pixels in the first image.

According to another aspect of the present invention, in the image processing unit, levels of similarity along a plurality of directions are determined, and the coefficients of the weighted addition are changed in accordance with the determined result.

According to another aspect of the present invention as set forth in (9), in the image processing unit, weighted addition on color information present at pixels in a narrowest range around a target pixel in the first image is performed. The narrowest range includes the color information corresponding to the at least three types of color components.

(12) Another image processing apparatus according to the present invention includes an image processing unit for receiving a first image, performing weighted addition on color information in the first image by using variable coefficients of not less than zero to generate a color component different from that of the color information in the first image, and outputting the generated color component as a second image. The first image is expressed in a plurality of color components and comprises a plurality of pixels each having color information corresponding to one of the color components. In the image processing unit, weighted addition on the color information in the first image in constant color-component ratios is performed over all the pixels in the first image.

According to another aspect of the present invention, in the image processing unit, levels of similarity along a plurality of directions are determined, and the coefficients of the weighted addition are changed in accordance with the determined result.

According to another aspect of the present apparatus of the present invention, in the image processing unit, when the first image is expressed in a first color component set with a higher pixel density and second and third color components set with a lower pixel density, weighted addition on color information corresponding to the second color component and color information corresponding to the third color component is performed at an identical color-component ratio.

(15) Another image processing apparatus according to the present invention includes an image processing unit for receiving a first image, performing weighted addition on color information in the first image by using variable coefficients of not less than zero to generate a color component different from that of the color information in the first image, performing filter processing with predetermined fixed filter coefficients to correct the color component different from that of the color information in the first image, and outputting the generated color component as a second image. The first image is expressed in a plurality of color components and comprises a plurality of pixels each having color information corresponding to one of the color components.

According to another aspect of the present invention, in the image processing unit, levels of similarity along a plurality of directions are determined, and the coefficients of the weighted addition are changed in accordance with the determined result.

According to another aspect of the present invention, in the image processing unit, filter coefficients including positive and negative values are used as the predetermined fixed filter coefficients.

(18) Another image processing apparatus according to the present invention includes an image processing unit for receiving a first image, generating a luminance component different from color information in the first image at the same pixel positions as in the first image by using the color information in the first image, generating a chrominance component different from the color information in the first image at the same pixel positions as in the first image separately from the luminance component, and outputting the luminance component and the chrominance component as a second image. The first image is expressed in a plurality of color components and comprises a plurality of pixels each having color information corresponding to one of the color components. In the image processing unit, weighted addition on color information in the first image is performed by using variable coefficients of not less than zero to generate the luminance component.

(19) Another image processing apparatus according to the present invention includes an image processing unit for receiving a first image, generating a luminance component different from color information in the first image at all of the same pixel positions as in the first image by using the color information in the first image, generating a chrominance component different from the color information in the first image at the same pixel positions as in the first image separately from the luminance component, and outputting the luminance component and the chrominance component as a second image. The first image is expressed in a plurality of color components and comprises a plurality of pixels each having color information corresponding to one of the color components.

According to another aspect of the present invention, in the image processing unit, levels of similarity along a plurality of directions are determined, and the luminance component is generated by performing weighted addition on the color information in the first image in accordance with the determined result.

According to another aspect of the present invention, in the image processing unit, levels of similarity along a plurality of directions are determined, and the chrominance component is generated by performing weighted addition on the color information in the first image in accordance with the determined result.

According to another aspect of the present invention, in the image processing unit, when the first image is expressed in a first color component, a second color component, and a third color component, similarity factors along a plurality of directions are calculated by using at least one similarity factor component out of:

a first similarity factor component consisting of the first color component and the second color component;

a second similarity factor component consisting of the second color component and the third color component;

a third similarity factor component consisting of the third color component and the first color component;

a fourth similarity factor component consisting of the first color component alone;

a fifth similarity factor component consisting of the second color component alone; and a sixth similarity factor component consisting of the third color component alone, and the levels of similarity along the plurality of directions are determined based on the similarity factors.

According to another aspect of the present invention, in the image processing unit, the color component of the second image is outputted in association with the same pixel positions as in the first image.

According to another aspect of the present invention, in the image processing unit, a luminance component is generated as a color component different from that of the color information in the first image.

(25) An image processing program according to the present invention is used on a computer to execute an image processing step for receiving a first image, performing weighted addition on color information in the first image to generate a color component different from that of the color information in the first image, and outputting the generated color component as a second image. The first image is expressed in a plurality of color components and comprises a plurality of pixels each having color information corresponding to one of the color components. In the image processing step, at least nine coefficient patterns consisting of values of not less than zero are prepared, and any one of the coefficient patterns is used for the weighted addition.

(26) Another image processing program according to the present invention is used on a computer to execute an image processing step for receiving a first image, performing weighted addition on color information in the first image by using variable coefficients of not less than zero to generate a color component different from that of the color information in the first image, and outputting the generated color component as a second image. The first-image is expressed in a plurality of color components and comprises a plurality of pixels each having color information corresponding to one of the color components. In the image processing step, weighted addition on color information present at a target pixel in the first image and color information present at pixels adjoining the target pixel is performed.

(27) Another image processing program according to the present invention is used on a computer to execute an image processing step for receiving a first image, performing weighted addition on color information in the first image by using variable coefficients of not less than zero to generate a color component different from that of the color information in the first image, and outputting the generated color component as a second image. The first image is expressed in three or more types of color components and comprises a plurality of pixels each having color information corresponding to one of the color components. In the image processing step, weighted addition on color information corresponding to at least three types of color components of the first image is performed over all the pixels in the first image.

(28) Another image processing program according to the present invention is used on a computer to execute an image processing step for receiving a first image, performing weighted addition on color information in the first image by using variable coefficients of not less than zero to generate a color component different from that of the color information in the first image, and outputting the generated color component as a second image. The first image is expressed in a plurality of color components and comprises a plurality of pixels each having color information corresponding to one of the color components. In the image processing step, weighted addition on the color information in the first image is performed in constant color-component ratios over all the pixels in the first image.

(29) Another image processing program according to the present invention is used on a computer to execute an image processing step for receiving a first image, performing weighted addition on color information in the first image by using variable coefficients of not less than zero to generate a color component different from that of the color information in the first image, performing filter processing with predetermined fixed filter coefficients to correct the color component different from that of the color information in the first image, and outputting the generated color component as a second image. The first image is expressed in a plurality of color components and comprises a plurality of pixels each having color information corresponding to one of the color components.

(30) Another image processing program according to the present invention is used on a computer to execute an image processing step for receiving a first image, generating a luminance component different from color information in the first image at the same pixel positions as in the first image by using the color information in the first image, generating a chrominance component different from the color information in the first image at the same pixel positions as in the first image separately from the luminance component, and outputting the luminance component and the chrominance component as a second image. The first image is expressed in a plurality of color components and comprises a plurality of pixels each having color information corresponding to one of the color components. In the image processing step, weighted addition on color information in the first image is performed by using variable coefficients of not less than zero to generate the luminance component.

(31) Another image processing program according to the present invention is used on a computer to execute an image processing step for receiving a first image, generating a luminance component different from color information in the first image at all of the same pixel positions as in the first image by using the color information in the first image, generating a chrominance component different from the color information in the first image at the same pixel positions as in the first image separately from the luminance component, and outputting the luminance component and the chrominance component as a second image. The first image is expressed in a plurality of color components and comprises a plurality of pixels each having color information corresponding to one of the color components.

These and other objects and advantages of the invention may be readily ascertained by referring to the following description and appended drawings.

BRIEF DESCRIPTION OF THE DRAWINGS

FIG. 2 illustrates the arrangement of the color components of the Bayer arrayed image data;

FIG. 7 is an illustration for explaining peripheral addition;

FIG. 8 illustrates an example of coefficient patterns;

FIG. 11 illustrates an example of a band-pass filter;

FIG. 12 illustrates an example of coefficient patterns;

FIG. 13 illustrates an example of coefficient patterns;

FIG. 14 is an illustration for explaining the interpolation processing of chrominance components;

FIG. 15 is an illustration for explaining the interpolation processing of chrominance components;

FIG. 17 is an operation flowchart of the image processing unit according to a second embodiment.

BEST MODE FOR CARRYING OUT THE INVENTION

Hereinafter, embodiments of the present invention will be described in detail with reference to the drawings.

Here, a first embodiment and a second embodiment will be described in conjunction with an electronic camera having the function of image enhancement which an image processing apparatus of the present invention performs.

Figure 1:
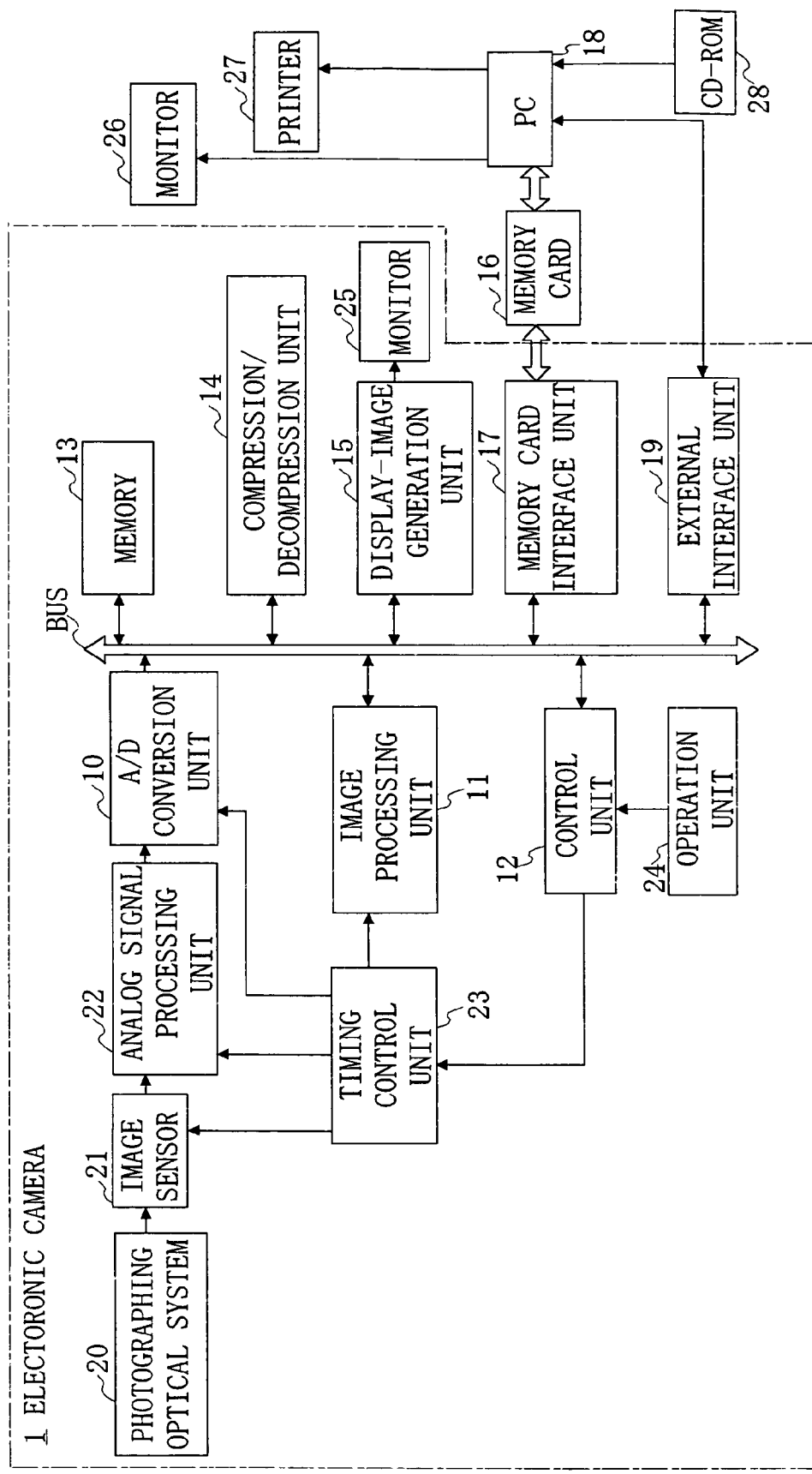
FIG. 1 is a functional block diagram of an electronic camera.

FIG. 1 is a functional block diagram of the electronic camera corresponding to the first embodiment and the second embodiment.

In FIG. 1, the electronic camera 1 includes an A/D conversion unit 10, an image processing unit (for example, a single-chip microprocessor dedicated to image processing) 11, a control unit 12, a memory 13, a compression/decompression unit 14, and a display-image generating unit 15.

The electronic camera 1 also includes a memory card interface unit 17 for achieving an interface with a memory card (a card type removable memory) 16, and is provided with an external interface unit 19 for achieving an interface with an external apparatus such as a PC (Personal Computer) 18 via a specific cable or wireless transmission path. Then, these components are connected to each other via a bus.

The electronic camera 1 also includes a photographing optical system 20, an image sensor 21, an analog signal processing unit 22, and a timing control unit 23. An optical image acquired by the photographing optical system 20 is formed on the image sensor 21. The output of the image sensor 21 is connected to the analog signal processing unit 22. The output of the analog signal processing unit 22 is connected to the A/D conversion unit 10. The output of the control unit 12 is connected to the timing control unit 23. The output of the timing control unit 23 is connected to the image sensor 21, the analog signal processing unit 22, the A/D conversion unit 10, and the image processing unit 11.

The electronic camera 1 also includes an operation unit 24 which is equivalent to a shutter release button, a selector button for mode switching, and so on, and a monitor 25. The output of the operation unit 24 is connected to the control unit 12. The output of the display-image generation unit 15 is connected to the monitor 25.

The PC 18 is connected with a monitor 26, a printer 27, and so on. An application program recorded in a CD-ROM 28 is previously installed therein. Aside from its CPU, memory, and hard disk which are not shown, the PC 18 also includes a memory card interface unit (illustration omitted) for achieving an interface with the memory card 16, and an external interface unit (illustration omitted) for achieving an interface with an external apparatus such as the electronic camera 1 via a specific cable or wireless transmission path.

In the electronic camera 1 having the configuration as in FIG. 1, when a photographing mode is selected and the shutter release button is pressed by an operator via the operation unit 24, the control unit 12 implements timing control over the image sensor 21, the analog signal processing unit 22, and the A/D conversion unit 10 via the timing control unit 23. The image sensor 21 generates image signals corresponding to the optical image. The image signals are subjected to predetermined signal processing in the analog signal processing unit 22, digitized by the A/D conversion unit 10, and supplied to the image processing unit 11 as image data.

In the electronic camera 1, R, G, and B color filters are arranged in a Bayer array at the image sensor 21. The image data supplied to the image processing unit 11 is thus expressed in the RGB colorimetric system in which each pixel contains color information corresponding to one of the three color components, that is, a red component (corresponding to the "second color component" or "third color component" as set forth in claims), a green component (corresponding to the "first color component" as set forth in claims), and a blue component (corresponding to the "third color component" or "second color component" as set forth in claims). Hereinafter, such image data will be referred to as "Bayer arrayed image data".

The image processing unit 11 receives such Bayer arrayed image data (corresponding to the "first image" as set forth in claims) and generates a luminance component, which is a color component of the YCbCr colorimetric system different from the RGB colorimetric system (corresponding to the "color component different from that of the color information in the first image" as set forth in claims) and chrominance components at all the pixels. That is, the image processing unit 11 generates a luminance plane consisting of the luminance component at all the pixels and chrominance planes consisting of the chrominance components at all the pixels, thereby achieving an enhancement of the image. From the luminance plane and the chrominance planes thus generated, the image processing unit 11 also generates RGB planes if needed. Hereinafter, a series of processes as described above will be referred to as an image restoration process.

It is to be noted that the image processing unit 11 performs image processing including tone conversion and edge enhancement, aside from such an image restoration process. After such image processing is completed, the image data are subjected to a specific type of compression processing in the compression/decompression unit 14, if necessary, and are recorded on the memory card 16 via the memory card interface unit 17.

The image data of which the image processing is completed may be recorded on the memory card 16 without compression processing, or may be converted into the colorimetric system adopted in the monitor 26 or the printer 27 connected to the PC 18 and may be supplied to the PC 18 through the external interface unit 19.

Now, when a replay mode is selected by the operator via the operation unit 24, image data recorded on the memory card 16 are read out through the memory card interface unit 17, are decompressed in the compression/decompression unit 14, and are displayed on the monitor 25 via the display-image generation unit 15.

It is to be noted that the decompressed image data may be converted into the colorimetric system adopted in the monitor 26 or the printer 27 connected to the PC 18 and may be supplied to the PC 18 through the external interface unit 19, not being displayed on the monitor 25.

Moreover, since the processing of converting the RGB planes generated by the image restoration process into the colorimetric system adopted in the monitors 25, 26, and the printer 27 can be achieved by known techniques, description thereof will be omitted.

FIG. 2 illustrates the arrangement of the color components of the Bayer arrayed image data.

Note that, in FIG. 2, the types of the color components are represented by R, G, and B, and the positions of pixels corresponding to the respective color components by the values of the coordinates [X,Y].

Hereinafter, pixel positions with an R color filter, a G color filter, and a B color filter in the Bayer array will be referred to as an R position, a G position, and a B position, respectively.

Specifically, FIG. 2(1) shows the case where an R position corresponds to the processing target pixel (corresponding to the "target pixel" as set forth in claims). FIG. 2(2) shows the case where a B position corresponds to the processing target pixel. FIG. 2(3) shows the case where a G position corresponds to the processing target pixel. Among the pixels on G positions, pixels horizontally adjoining red components will be hereinafter referred to as "pixels on Gr positions", and pixels horizontally adjoining blue components will be referred to as "pixels on Gb positions".

In the arithmetic expressions to be described later, when the color information in each pixel is distinguished between the green component and the other color components, R and B in FIG. 2 are replaced with Z so that the color information in an R position or a B position is expressed as Z[i,j] and the color information in a G position is expressed as G[i,j]. Moreover, when the color information in each pixel is not distinguished among the color components, R, G, and B in FIG. 2 is replaced with A so that the color information in an arbitrary pixel is expressed as A[i,j].

DESCRIPTION OF FIRST EMBODIMENT

FIGS. 3 through 6 are operation flowcharts of the image processing unit 11 according to the first embodiment.

Figure 3:
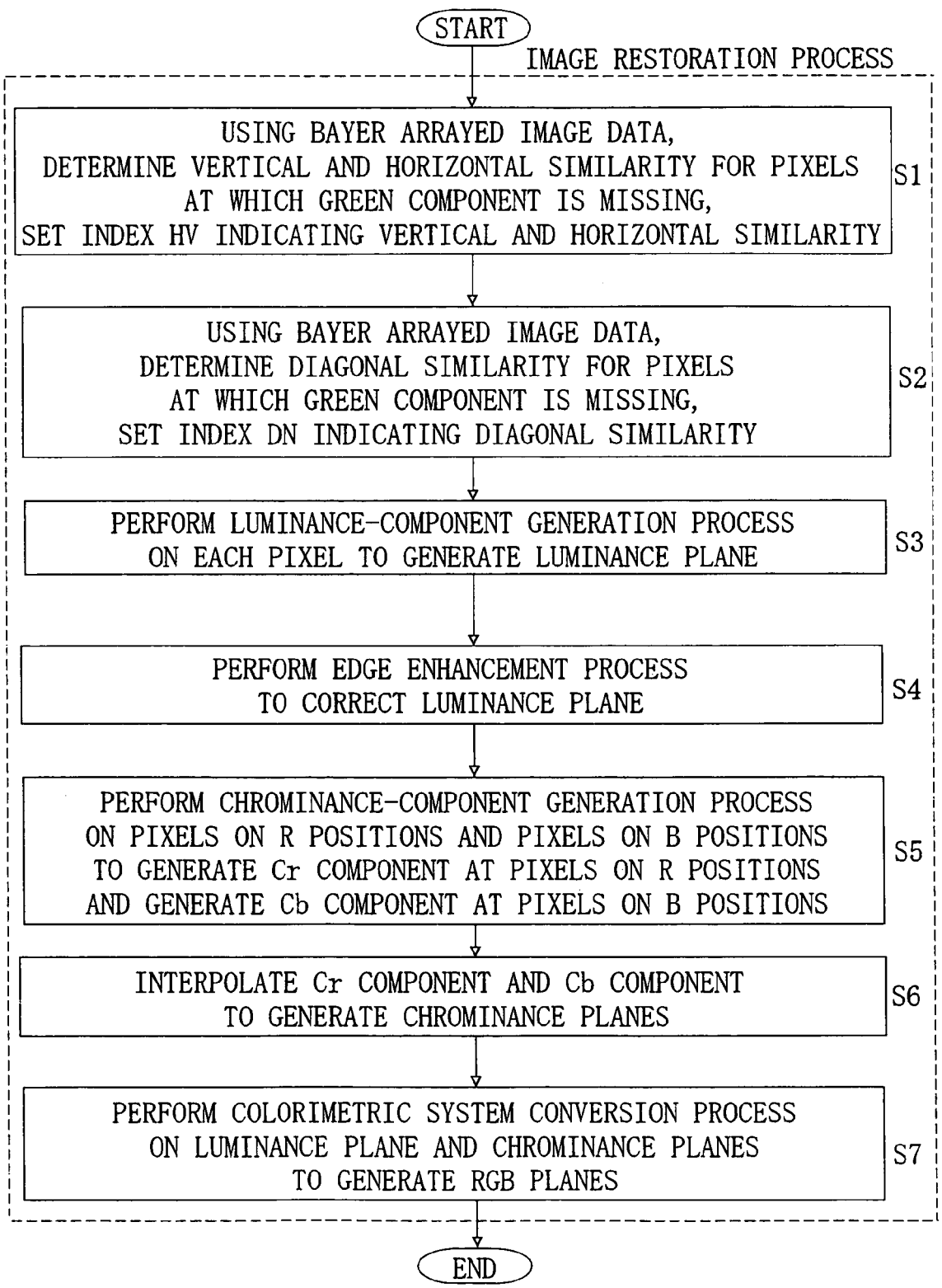
FIG. 3 is an operation flowchart of an image processing unit according to a first embodiment.
Figure 4:
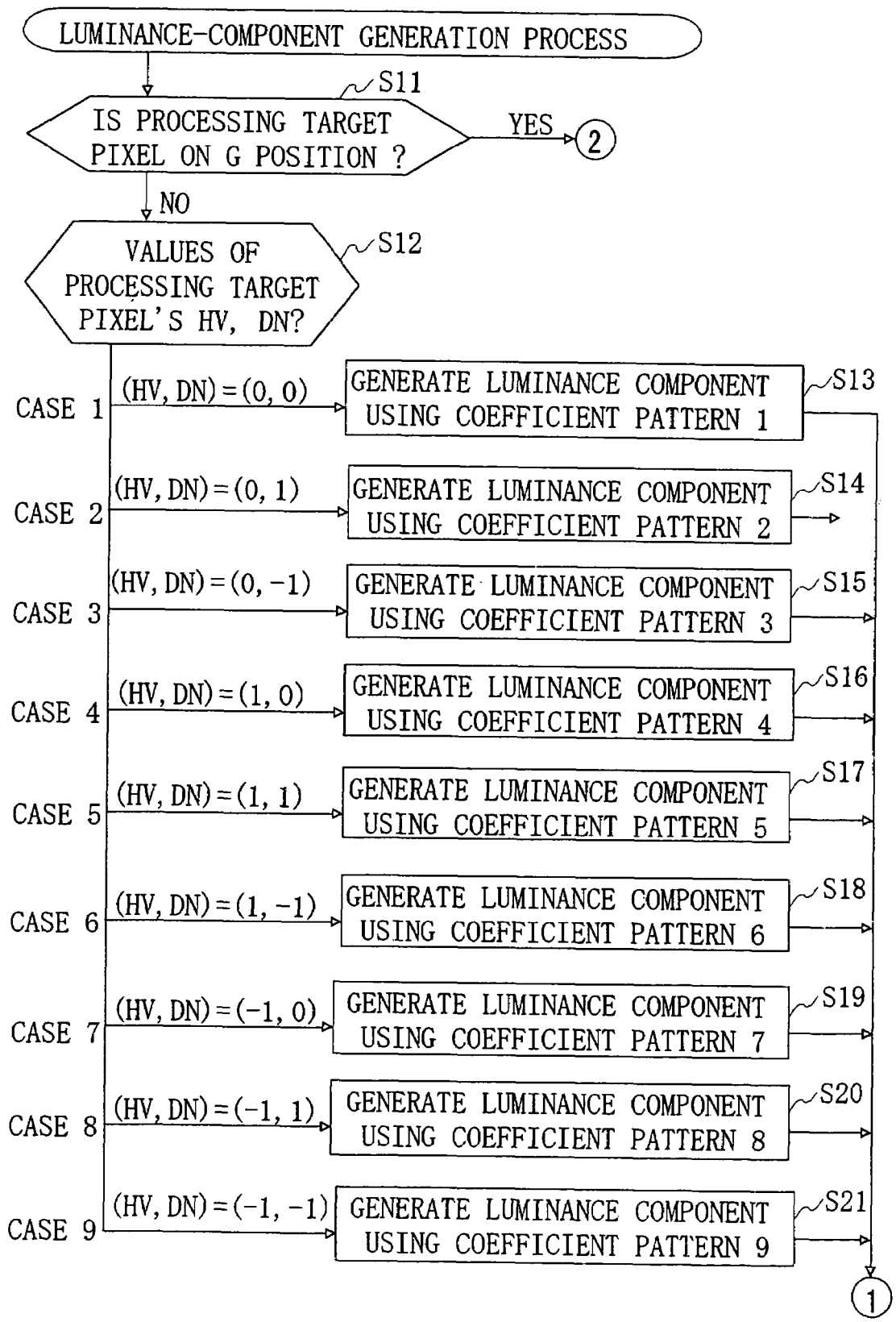
FIG. 4 is an operation flowchart of the image processing unit according to the first embodiment.
Figure 5:
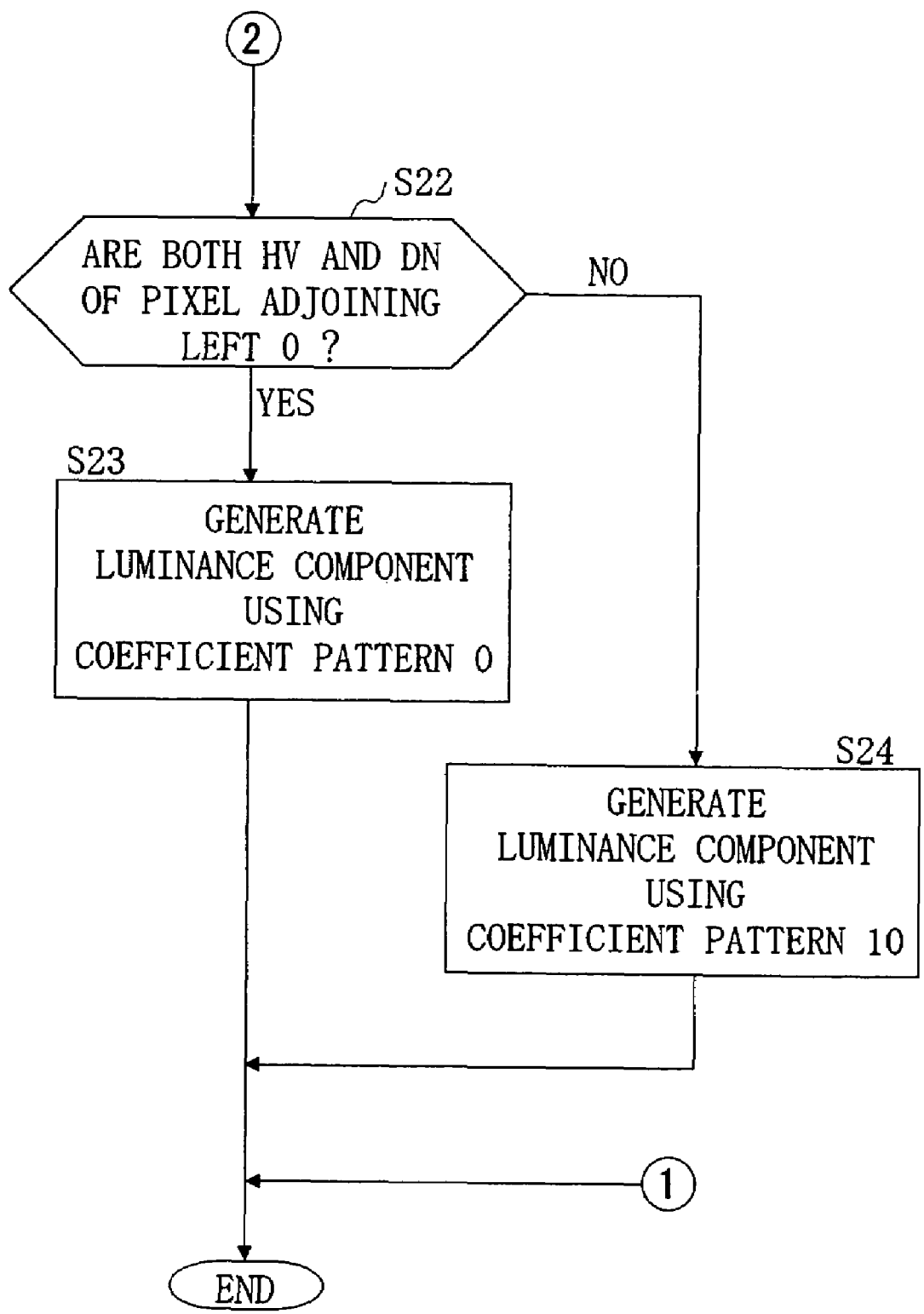
FIG. 5 is an operation flowchart of the image processing unit according to the first embodiment.
Figure 6:
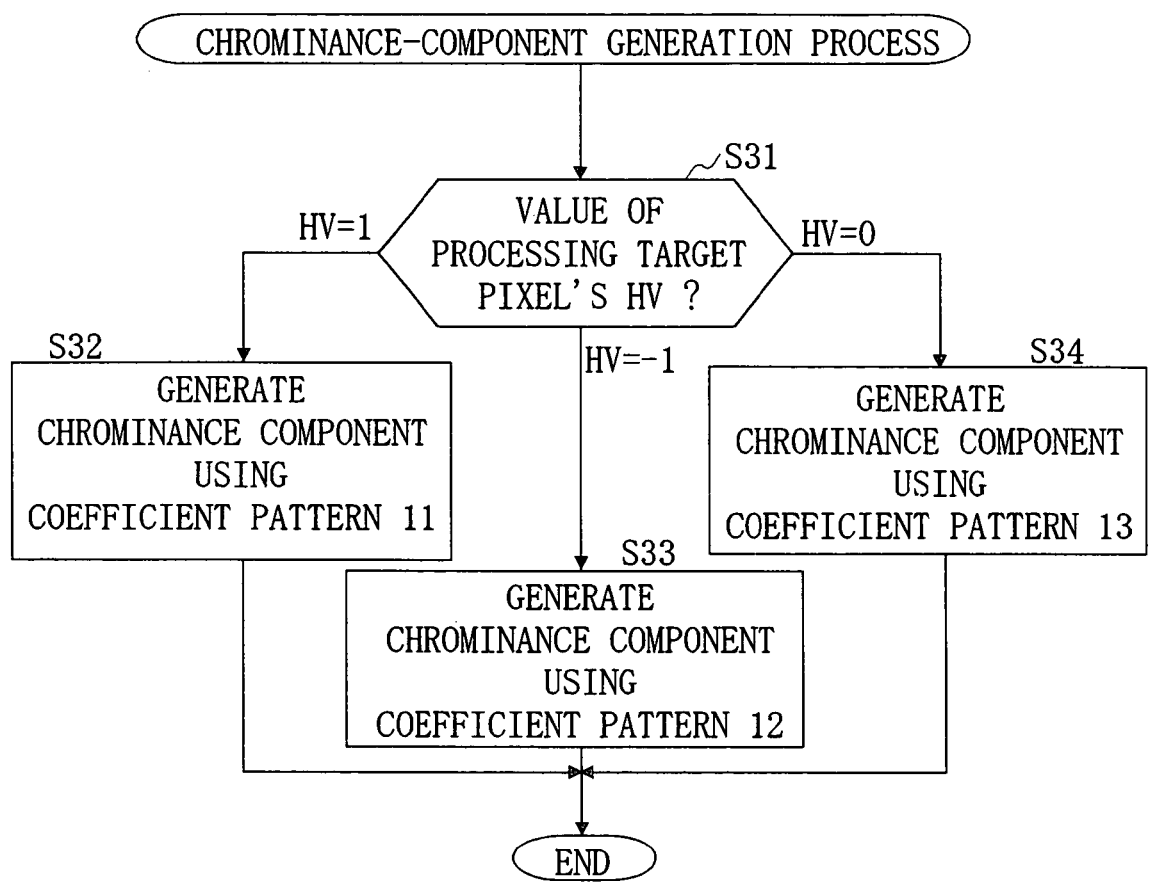
FIG. 6 is an operation flowchart of the image processing unit according to the first embodiment.

Note that FIGS. 3 through 6 show operations of the image restoration process out of the image processing to be performed in the image processing unit 11. FIG. 3 shows an operation of the image restoration process in rough outline. FIGS. 4 and 5 show operations of a "luminance-component generation process" which is included in the image restoration process. FIG. 6 shows an operation of a "chrominance-component generation process" which is included in the image restoration process.

Hereinafter, the first embodiment will be described. In the following, operations of the image restoration process will be explained out of the image processing performed in the image processing unit 11. The rest of the operations will be omitted from the description.

Initially, in the image processing unit 11, a determination is made with regard to similarity along the vertical direction and the horizontal direction (hereinafter, referred to as "vertical and horizontal similarity") for a pixel at which the green component is missing, by using the Bayer arrayed image data. As a result of such determination, an index HV is set for indicating the vertical and horizontal similarity (S1 in FIG. 3).

<<Example of Processing of Setting Index HV for Indicating Vertical and Horizontal similarity>>

For example, the image processing unit 11 performs the processing of setting the index HV for indicating the vertical and horizontal similarity in the following manner.

Initially, the image processing unit 11 calculates a same color similarity factor Cv0 along the vertical direction and a same color similarity factor Ch0 along the horizontal direction, which are defined as in Equations 1 and 2 shown below, for a pixel at which the green component is missing. In addition, the image processing unit 11 calculates a different color similarity factor CvN0 along the vertical direction and a different color similarity factor ChN0 along the horizontal direction, which are defined as in Equations 3 and 4 shown below, for a pixel at which the green component is missing.

<<Same Color Similarity Factors>>:

$$Cv0[i,j]=(|G[i,j-1]-G[i,j+1]|+(|Z[i-1,j-1]-Z[i-1,j+1]|+|Z[i+1,j-1]-Z[i+1,j+1]|)/2)/2, \quad \text{Eq. 1}$$

$$Ch0[i,j]=(|G[i-1,j]-G[i+1,j]|+(|Z[i-1,j-1]-Z[i+1,j-1]|+|Z[i-1,j+1]-Z[i+1,j+1]|)/2)/2. \quad \text{Eq. 2}$$

<<Different Color Similarity Factors>>:

$$CvN0[i,j]=(|G[i,j-1]-Z[i,j]|+|G[i,j+1]-Z[i,j]|)/2, \quad \text{Eq. 3}$$

$$ChN0[i,j]=(|G[i-1,j]-Z[i,j]|+|G[i+1,j]-Z[i,j]|)/2 \quad \text{Eq. 4}$$

The values calculated by using Equations 1 through 4 may be directly used, as the same color similarity factors and the different color similarity factors along the vertical and horizontal directions for the pixel on the coordinates [i,j]. Nevertheless, this example will deal with the case where similar values are calculated not only for the pixel but also for pixels lying around the pixel, and the individual values are subjected to weighted additions direction by direction (hereinafter, referred to as "peripheral addition") to obtain the ultimate same color similarity factors and different color similarity factors along the vertical direction and horizontal direction for the pixel at which the green component is missing.

That is, based on Equations 1 through 4, the image processing unit 11 performs calculations on pixels lying on the coordinates [i,j], [i−1,j−1], [i+1,j−1], [i−1,j+1], [i+1,j+1], [i,j−2], [i,j+2], [i−2,j], and [i+2,j]. Then, the values obtained from the calculations are subjected to peripheral addition expressed in the following Equations 5 through 8, whereby a same color similarity factor Cv[i,j] along the vertical direction, a same color similarity factor Ch[i,j] along the horizontal direction, a different color similarity factor CvN[i,j] along the vertical direction, and a different color similarity factor ChN[i,j] along the horizontal direction are obtained.

Figure 7:
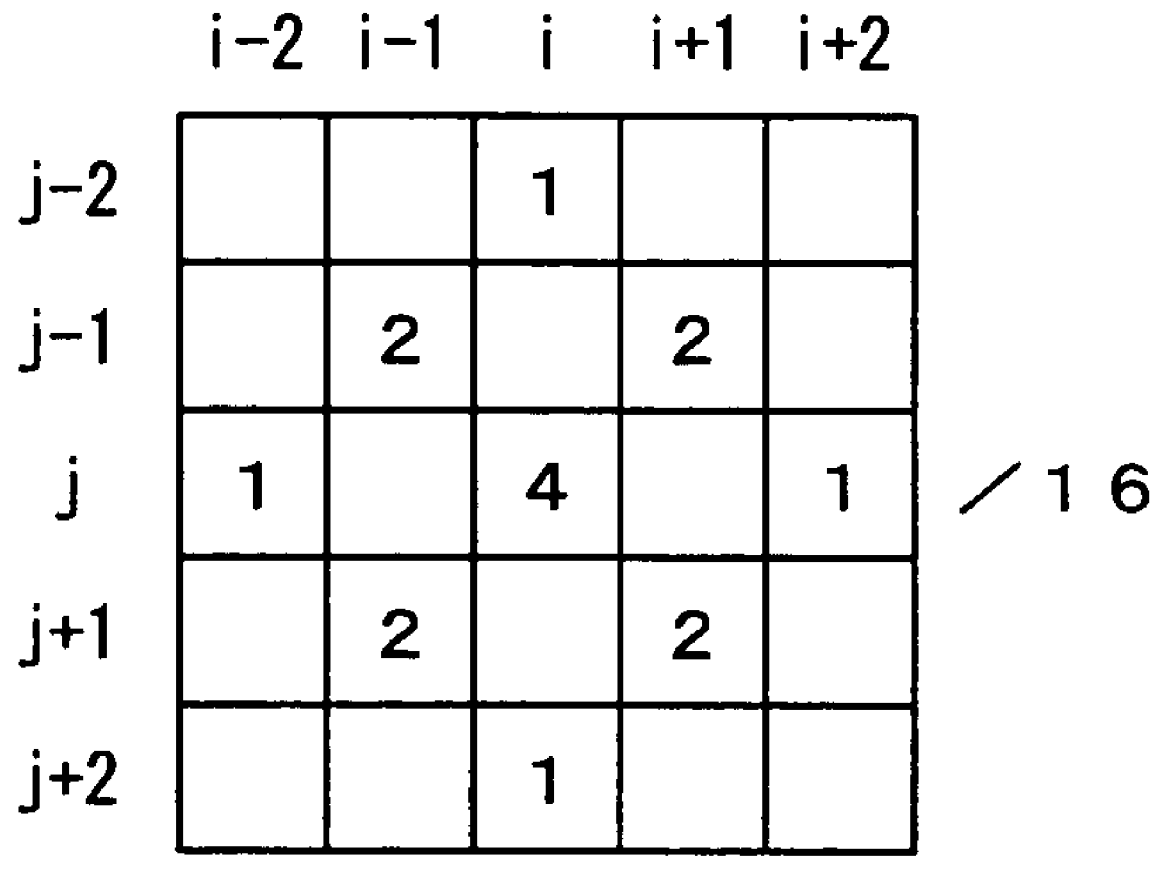

Note that the similarity factors obtained from Equations 5 through 8 each indicate higher degree of similarity with their smaller values. Equations 5 through 8 correspond to performing peripheral addition as shown in FIG. 7.

<<Same Color Similarity Factors>>:

$$Cv[i, j] = (4 \cdot Cv0[i, j] + 2 \cdot (Cv0[i-1, j-1] + Cv0[i+1, j-1] + \quad \text{Eq. 5}$$
$$Cv0[i-1, j+1] + Cv0[i+1, j+1]) + Cv0[i, j-2] +$$
$$Cv0[i, j+2] + Cv0[i-2, j] + Cv0[i+2, j])/16,$$

$$Ch[i, j] = (4 \cdot Ch0[i, j] + 2 \cdot (Ch0[i-1, j-1] + Ch0[i+1, j-1] + \quad \text{Eq. 6}$$
$$Ch0[i-1, j+1] + Ch0[i+1, j+1]) + Ch0[i, j-2] +$$
$$Ch0[i, j+2] + Ch0[i-2, j] + Ch0[i+2, j])/16.$$

<<Different Color Similarity Factors>>:

$$CvN[i, j] = \quad \text{Eq. 7}$$
$$(4 \cdot CvN0[i, j] + 2 \cdot (CvN0[i-1, j-1] + CvN0[i+1, j-1] +$$
$$CvN0[i-1, j+1] + CvN0[i+1, j+1]) + CvN0[i, j-2] +$$
$$CvN0[i, j+2] + CvN0[i-2, j] + CvN0[i+2, j])/16,$$

$$ChN[i, j] = \quad \text{Eq. 8}$$
$$(4 \cdot ChN0[i, j] + 2 \cdot (ChN0[i-1, j-1] + ChN0[i+1, j-1] +$$
$$ChN0[i-1, j+1] + ChN0[i+1, j+1]) + ChN0[i, j-2] +$$
$$ChN0[i, j+2] + ChN0[i-2, j] + ChN0[i+2, j])/16.$$

For example, when the pixel lying on the coordinates [i,j] is on an R position as shown in FIG. 2(1), the same color similarity factors Cv0 and Ch0 are obtained from a G-G similarity factor component consisting of color information corresponding to the green component alone (corresponding to the "fourth similarity factor component" as set forth in claims) and a B-B similarity factor component consisting of color information corresponding to the blue component alone (corresponding to the "sixth similarity factor component" or "fifth similarity factor component" as set forth in claims). In this case, the same color similarity factors Cv and Ch obtained after the peripheral addition contain an R-R similarity factor component consisting of color information corresponding to the red component alone (corresponding to the "fifth similarity factor component" or "sixth similarity factor component" as set forth in claims) aside from the G-G similarity factor component and the B-B similarity factor component.

Moreover, when the pixel lying on the coordinates [i,j] is on an R position, the different color similarity factors CvN0 and ChN0 are obtained from a G-R similarity factor component consisting of color information corresponding to the green component and color information corresponding to the red component (corresponding to the "first similarity factor component" or "third similarity factor component" as set forth in claims). In this case, the different color similarity factors CvN and ChN obtained after the peripheral addition contain a G-B similarity factor component consisting of color information corresponding to the green component and color information corresponding to the blue component (corresponding to the "third similarity factor component" or "first similarity factor component" as set forth in claims) aside from the G-R similarity factor component.

That is, according to the peripheral additions, similarity factors can be obtained by taking into consideration a plurality of color components and also taking into consideration continuity with surrounding pixels. This means a higher degree of accuracy of the similarity factors.

By the way, in Equations 3 and 4, each term enclosed in the absolute value brackets is composed of color information provided at two adjoining pixels. Thus, the different color similarity factors obtained by Equations 3 and 4 have the function of enabling a similarity determination on fine structures of Nyquist frequency level which fluctuate pixel by pixel. Moreover, these different color similarity factors are obtained on the assumption that all the color information corresponding to different color components shows the same luminance information. The determination on the levels of similarity using the different color similarity factors is thus highly reliable on achromatic areas.

Meanwhile, the determination on the levels of similarity using the same color similarity factors is generally reliable on both chromatic areas and achromatic areas, whereas the reliability on areas of fine image structures is inferior to the case where the different color similarity factors should be used.

Consequently, to make highly reliable similarity determination over an entire image, it is desirable that the entire image be divided into achromatic areas and chromatic areas in which similarity factors suitable for the respective areas are to be used.

To determine whether an image near the processing target pixel is an achromatic area or not, a color index is required which indicates the presence or absence of local color. Among such color indexes available is local color-difference information. The different color similarity factors obtained as described above reflect the levels of similarity and the local color-difference information as well. Hence, the different color similarity factors can be directly used as the color index.

It should be noted that the different color similarity factors indicate higher degree of similarity with their smaller values. Thus, when the different color similarity factors along both the vertical direction and horizontal direction have large values, they mean that the processing target pixel is in an achromatic area having low similarity along both the vertical direction and horizontal direction, or the image near the processing target pixel is a chromatic area. On the other hand, when the different color similarity factors have a relatively small value at least along either one of the vertical direction and the horizontal direction, it means that the image near the processing target pixel is an achromatic area and there is a direction(s) of high similarity.

The image processing unit 11 determines that the image near the processing target pixel is an achromatic area if a condition expressed as:

$$CvN[i,j] \leq ThNv, \text{ or } ChN[i,j] \leq ThNh. \qquad \text{Condition 1}$$

is satisfied with regard to threshold values ThNv and ThNh. If Condition 1 is not satisfied, the image processing unit 11 determines that the image near the processing target pixel is a chromatic area. Here, the threshold values ThNv and ThNh are set to the order of 10 or less respectively when the gray scale is represented by 256.

When the image near the processing target pixel is an achromatic area, the image processing unit 11 then judges if a condition expressed as:

$$|CvN[i,j] - ChN[i,j]| \leq Th0. \qquad \text{Condition 2}$$

is satisfied or not with regard to a threshold value Th0.

Condition 2 is a condition for deciding whether or not the different color similarity factor CvN[i,j] along the vertical direction and the different color similarity factor ChN[i,j] along the horizontal direction are in the same order. The threshold value Th0 has a role to avoid a noise-based misjudgment that either one of the similarities is high, when a difference between the different color similarity factor CvN[i,j] along the vertical direction and the different color similarity factor ChN[i,j] along the horizontal direction is small. Consequently, a further precise determination of similarity can be made by setting the threshold value Th0 higher for noisy color images.

If Condition 2 is satisfied, the image processing unit 11 determines that the processing target pixel has low (or high) similarity along both the vertical and horizontal directions, and sets "0" to the index HV[i,j] for indicating the vertical and horizontal similarity. On the other hand, if Condition 2 is not satisfied, the image processing unit 11 judges if the following condition expressed as:

$$CvN[i,j] < ChN[i,j]. \qquad \text{Condition 3}$$

is satisfied or not. If Condition 3 is satisfied, the image processing unit 11 determines that the processing target pixel has high similarity along the vertical direction, and sets "1" to the index HV[i,j] for indicating the vertical and horizontal similarity. On the other hand, if Condition 3 is not satisfied, the image processing unit 11 determines that the processing target pixel has high similarity along the horizontal direction, and sets "−1" to the index HV[i,j] for indicating the vertical and horizontal similarity.

Moreover, when the image near the processing target pixel is a chromatic area, the image processing unit 11 judges if a condition expressed as:

$$|Cv[i,j] - Ch[i,j]| \leq Th1. \qquad \text{Condition 4}$$

is satisfied or not with regard to a threshold value Th1.

Condition 4 is a condition for deciding whether or not the same color similarity factor Cv[i,j] along the vertical direction and the same color similarity factor Ch[i,j] along the horizontal direction are in the same order. The threshold value Th1 has a role to avoid a noise-based misjudgment that either one of the similarities is high, when a difference between the same color similarity factor Cv[i,j] along the vertical direction and the same color similarity factor Ch[i,j] along the vertical direction is small. As is the case with the threshold value Th0, a further precise determination of similarity can be made by setting the threshold value Th1 higher for noisy color images.

If Condition 4 is satisfied, the image processing unit 11 determines that the processing target pixel has low (or high) similarity along both the vertical and horizontal directions, and sets "0" to the index HV[i,j] for indicating the vertical and horizontal similarity. On the other hand, if Condition 4 is not satisfied, the image processing unit 11 judges if the following condition expressed as:

$$Cv[i,j] < Ch[i,j]. \qquad \text{Condition 5}$$

is satisfied or not. If Condition 5 is satisfied, the image processing unit 11 determines that the processing target pixel has high similarity along the vertical direction, and sets "1" to the index HV[i,j] for indicating the vertical and horizontal similarity. On the other hand, if Condition 5 is not satisfied, the image processing unit 11 determines that the processing target pixel has high similarity along the horizontal direction, and sets "−1" to the index HV[i,j] for indicating the vertical and horizontal similarity.

After the processing of setting the index HV for indicating the vertical and horizontal similarity as described above, the image processing unit 11 determines the similarity along the 45° diagonal direction and 135° diagonal direction (hereinafter, referred to as "diagonal similarity") for a pixel at which the green component is missing by using the Bayer arrayed image data. As a result of such determination, an index DN is set for indicating the diagonal similarity (S2 in FIG. 3).

<<Example of Processing of Setting Index DN for Indicating diagonal Similarity>>

For example, the image processing unit 11 performs the processing of setting the index DN for indicating the diagonal similarity in the following manner.

Initially, the image processing unit 11 calculates a similarity factor C45_0 along the 45° diagonal direction and a similarity factor C135_0 along the 135° diagonal direction, which are defined as in Equations 9 and 10 shown below, for a pixel at which the green component is missing:

$$C45\_0[i,j] = ((|G[i, j-1] - G[i-1, j]| + |G[i+1, j] - \qquad \text{Eq. 9}$$
$$G[i, j+1]|)/2 + |Z[i+1, j-1] - Z[i-1, j+1]| +$$
$$(|Z[i+1, j-1] - Z[i, j]| + |Z[i-1, j+1] - Z[i, j]|)/2)/3,$$

$$C135\_0[i,j] = ((|G[i, j-1] - G[i+1, j]| + |G[i-1, j] - \qquad \text{Eq. 10}$$
$$G[i, j+1]|)/2 + |Z[i-1, j-1] - Z[i+1, j+1]| +$$
$$(|Z[i-1, j-1] - Z[i, j]| + |Z[i+1, j+1] - Z[i, j]|)/2)/3.$$

For example, when the pixel lying on the coordinates [i,j] is on an R position, the similarity factor C45$_{13}$ 0 along the 45° diagonal direction and the similarity factor C135_0 along the 135° diagonal direction are composed of a G-G similarity factor component, a B-B similarity factor component, and an R-B similarity factor component consisting of the color information corresponding to the red component and the color information corresponding to the blue component (corresponding to the "second similarity factor component" as set forth in claims) in order.

Then, the image processing unit 11 performs peripheral additions as expressed in the following Equations 11 and 12 to obtain a similarity factor C45 [i,j] along the 45° diagonal direction and a similarity factor C135 [i,j] along the 135° diagonal direction. Here, Equations 11 and 12 correspond to performing peripheral additions as shown in FIG. 7.

$$C45[i, j] = \qquad \text{Eq. 11}$$
$$(4 \cdot C45\_0[i, j] + 2 \cdot (C45\_0[i-1, j-1] + C45\_0[i+1, j-1] +$$
$$C45\_0[i-1, j+1] + C45\_0[i+1, j+1]) + C45\_0[i, j-2] +$$
$$C45\_0[i, j+2] + C45\_0[i-2, j] + C45\_0[i+2, j])/16,$$

$$C135[i, j] = (4 \cdot C135\_0[i, j] + 2 \cdot (C135\_0[i-1, j-1] + \qquad \text{Eq. 12}$$
$$C135\_0[i+1, j-1] + C135\_0[i-1, j+1] +$$
$$C135\_0[i+1, j+1]) + C135\_0[i, j-2] + C135\_0[i, j+2] +$$
$$C135\_0([i-2, j] + C135\_0[i+2, j])/16.$$

That is, according to the peripheral additions, the similarity factors can be obtained with a higher degree of accuracy since a plurality of color components and the continuity with surrounding pixels are taken into account as is the case with the vertical and horizontal directions.

Next, the image processing unit 11 judges if a condition expressed as:

$$|C45[i,j] - C135[i,j]| \leq Th2. \qquad \text{Condition 6}$$

is satisfied or not with regard to a threshold value Th2. If Condition 6 is satisfied, the image processing unit 11 determines that the processing target pixel has low (or high) similarity along the diagonal directions, and sets "0" to the index DN[i,j] for indicating the diagonal similarity. On the other hand, if Condition 6 is not satisfied, the image processing unit 11 judges if the following condition expressed as:

$$C45[i,j] < C135[i,j]. \qquad \text{Condition 7}$$

is satisfied or not.

If Condition 7 is satisfied, the image processing unit 11 determines that the processing target pixel has high similarity along the 45° diagonal direction, and sets "1" to the index DN[i,j] for indicating the diagonal similarity. On the other hand, if Condition 7 is not satisfied, the image processing unit 11 determines that the processing target pixel has high similarity along the 135° diagonal direction, and sets "-1" to the index DN[i,j] for indicating the diagonal similarity.

After the processing of setting the index DN for indicating the diagonal similarity is completed as described above, the image processing unit 11 performs the "luminance-component generation process" shown in FIGS. 4 and 5 on each of the pixels, thereby generating a luminance plane (S3 in FIG. 3).

The "luminance-component generation process" of the first embodiment will deal with the case where a luminance component is generated by subjecting the color information present at a plurality of pixels lying in a local area, out of the Bayer arrayed image data, to weighted addition. Note that the color information to be used in such weighted addition is determined based upon the levels of similarity at the processing target pixel. Coefficients for the weighted addition are set so that the luminance component contains R, G, and B in constant ratios. In the first embodiment, to achieve such a "luminance-component generation process", a plurality of types of coefficient patterns having different coefficients according to the levels of similarity (corresponding to the "at least nine coefficient patterns" as set forth in claims) are prepared.

FIG. 8 illustrates an example of the coefficient patterns used in the generation of a luminance component.

Here, all of $\alpha$, $\beta$, $u_1$, $u_2$, $v_1$, $v_2$, $s_1$, $s_2$, $t_1$, and $t_2$ shown in FIG. 8 are values of not less than zero, satisfying the following condition:

$$\alpha + \beta = 1, \; u_1 + u_2 = 1, \; v_1 + v_2 = 1, \; s_1 + s_2 = 1, \text{ and } t_1 + t_2 = 1.$$

The coefficient patterns shown in FIG. 8 are set so that the luminance component contains R, G, and B in ratios of "$\beta/2:\alpha:\beta/2$". The color information corresponding to the red component and the color information corresponding to the blue component are subjected to weighted addition in an identical ratio. That is, a luminance component Y satisfies the relationship:

$$Y = \alpha \cdot G + \beta \cdot (R+B)/2.$$

Therefore, a common coefficient pattern can be used for pixels on Gr positions and pixels on Gb positions. Common coefficient patterns can also be used for pixels on R positions and pixels on B positions.

Among typical examples of preferable settings of constants are as follows:

$$u_1 \approx u_2, \; v_1 \approx v_2, \; s_1 \approx s_2, \text{ and } t_1 \approx t_2; \text{ and}$$

$$(\alpha, \beta) = (1/3, 2/3), \; (4/9, 5/9), \; (5/11, 6/11), \; (1/2, 1/2),$$
$$(5/9, 4/9), \; (3/5, 2/5), \text{ and } (2/3, 1/3).$$

It is to be noted that the ratios of R, G, and B constituting a luminance component are not limited to "$\beta/2:\alpha:\beta/2$", but may be "$\alpha:\beta:\gamma$" ($\alpha+\beta+\gamma=1$, $\alpha \geq 0$, $\beta \geq 0$, $\gamma \geq 0$) and so on. For example, $\alpha=0.3$, $\beta=0.6$, and $\gamma=0.1$. Nevertheless, when the RGB ratios are set as "$\alpha:\beta:\gamma$", coefficient patterns must be separately provided for the pixels on Gr positions and the pixels on Gb positions, and coefficient patterns must be separately provided for the pixels on R positions and the pixels on B positions.

<<Explanation of Luminance-Component Generation Process>>

Now, with reference to FIGS. 4 and 5, the "luminance-component generation process" will be explained.

Initially, the image processing unit 11 judges whether the processing target pixel is on a G position or not (S11 in FIG. 4).

When the processing target pixel is not on a G position (NO at S11 in FIG. 4), the image processing unit 11 judges what values the index HV[i,j] for indicating the vertical and horizontal similarity and the index DN[i,j] for indicating the diagonal similarity at the processing target pixel have (S12 in FIG. 4), and classifies the levels of similarity at the processing target pixel into any one of case 1 to case 9 shown below:

case 1: (HV[i,j],DN[i,j])=(0,0): high similarity along all the directions, or low similarity along all the directions (the direction of high similarity is undetermined);

case 2: (HV[i,j],DN[i,j])=(0,1): high similarity along the 45° diagonal direction;

case 3: (HV[i,j],DN[i,j])=(0,-1): high similarity along the 135° diagonal direction;

case 4: (HV[i,j],DN[i,j])=(1,0): high similarity along the vertical direction;

case 5: (HV[i,j],DN[i,j])=(1,1): high similarity along the vertical and 45° diagonal directions;

case 6: (HV[i,j],DN[i,j])=(1,-1): high similarity along the vertical and 135° diagonal directions;

case 7: (HV[i,j],DN[i,j])=(-1,0): high similarity along the horizontal direction;

case 8: (HV[i,j],DN[i,j])=(−1,1): high similarity along the horizontal and 45° diagonal directions; and case 9: (HV[i,j],DN[i,j])=(−1,−1): high similarity along the horizontal and 135° diagonal directions.

Figures 9, 10:
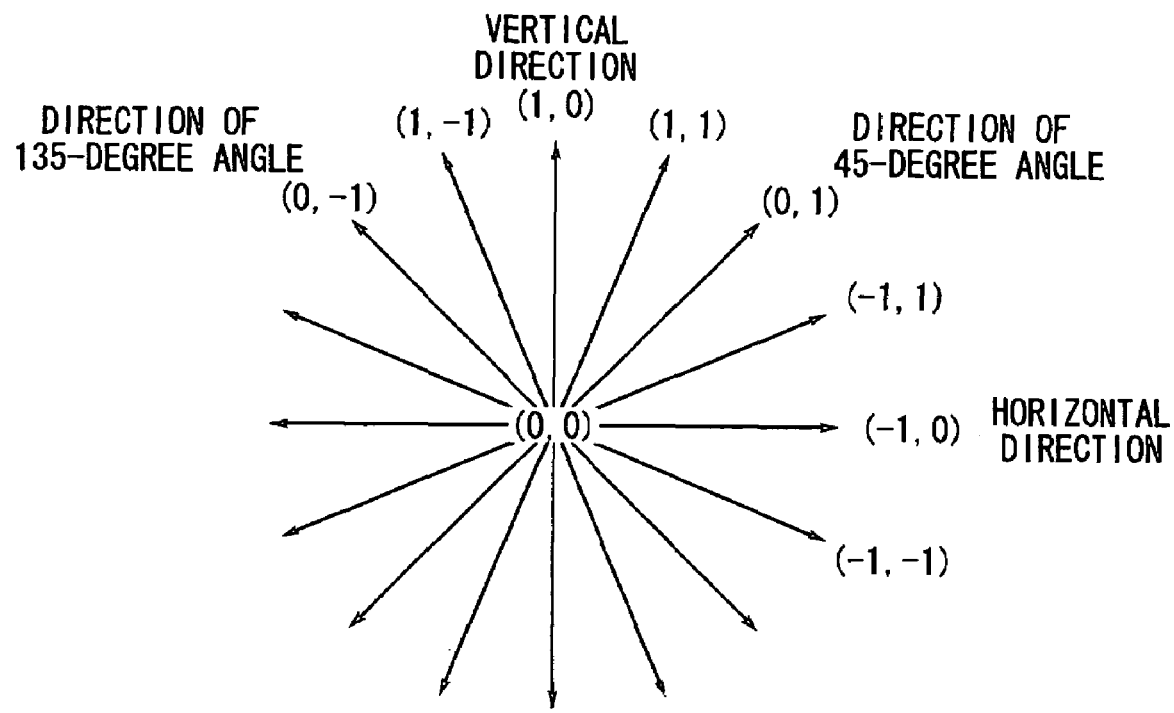
FIG. 9 shows directions of high similarity corresponding to the values of (HV[i,j],DN[i,j])
FIG. 10 illustrates an example of a coefficient pattern.

FIG. 9 shows directions of high similarity corresponding to the values of (HV[i,j],DN[i,j]).

According to the determined results mentioned above, the image processing unit 11 generates a luminance component as follows:

When the processing target pixel is classified as case 1, the image processing unit 11 generates a luminance component by using the coefficient pattern 1 (S13 in FIG. 4);

When the processing target pixel is classified as case 2, the image processing unit 11 generates a luminance component by using the coefficient pattern 2 (S14 in FIG. 4);

When the processing target pixel is classified as case 3, the image processing unit 11 generates a luminance component by using the coefficient pattern 3 (S15 in FIG. 4);

When the processing target pixel is classified as case 4, the image processing unit 11 generates a luminance component by using the coefficient pattern 4 (S16 in FIG. 4);

When the processing target pixel is classified as case 5, the image processing unit 11 generates a luminance component by using the coefficient pattern 5 (S17 in FIG. 4);

When the processing target pixel is classified as case 6, the image processing unit 11 generates a luminance component by using the coefficient pattern 6 (S18 in FIG. 4);

When the processing target pixel is classified as case 7, the image processing unit 11 generates a luminance component by using the coefficient pattern 7 (S19 in FIG. 4);

When the processing target pixel is classified as case 8, the image processing unit 11 generates a luminance component by using the coefficient pattern 8 (S20 in FIG. 4); and When the processing target pixel is classified as case 9, the image processing unit 11 generates a luminance component by using the coefficient pattern 9 (S21 in FIG. 4).

That is, the luminance component Y[i,j] is generated through the operation of any one of the following Equations 13 through 21, using a coefficient pattern selected from the nine coefficient patterns 1 through 9 in accordance with the cases 1 through 9:

Coefficient pattern 1:

$$Y[i, j] = (\beta/2) \cdot A[i, j] + \\ \alpha \cdot ((v_1/2) \cdot A[i-1, j] + (v_2/2) \cdot A[i+1, j] + \\ (u_1/2) \cdot A[i, j-1] + (u_2/2) \cdot A[i, j+1]) + \\ (\beta/2) \cdot ((s_1/2) \cdot A[i-1, j-1] + (s_2/2) \cdot A[i+1, j+1] + \\ (t_1/2) \cdot A[i+1, j-1] + (t_2/2) \cdot A[i-1, j+1]);$$

Eq. 13

Coefficient pattern 2:

$$Y[i, j] = (\beta/2) \cdot A[i, j] + \\ \alpha \cdot ((v_1/2) \cdot A[i-1, j] + (v_2/2) \cdot A[i+1, j] + \\ (u_1/2) \cdot A[i, j-1] + (u_2/2) \cdot A[i, j+1]) + \\ (\beta/2) \cdot (t_1 \cdot A[i+1, j-1] + t_2 \cdot A[i-1, j+1]);$$

Eq. 14

Coefficient pattern 3:

$$Y[i, j] = (\beta/2) \cdot A[i, j] + \\ \alpha \cdot ((v_1/2) \cdot A[i-1, j] + (v_2/2) \cdot A[i+1, j] + \\ (u_1/2) \cdot A[i, j-1] + (u_2/2) \cdot A[i, j+1]) + \\ (\beta/2) \cdot (s_1 \cdot A[i-1, j-1] + s_2 \cdot A[i+1, j+1]);$$

Eq. 15

Coefficient pattern 4:

$$Y[i, j] = (\beta/2) \cdot A[i, j] + \\ \alpha \cdot (u_1 \cdot A[i, j-1] + u_2 \cdot A[i, j+1]) + (\beta/2) \cdot \\ ((s_1/2) \cdot A[i-1, j-1] + (s_2/2) \cdot A[i+1, j+1] + \\ (t_1/2) \cdot A[i+1^1, j-1] + (t_2/2) \cdot A[i-1, j+1]);$$

Eq. 16

Coefficient pattern 5:

$$Y[i, j] = (\beta/2) \cdot A[i, j] + \\ \alpha \cdot (u_1 \cdot A[i, j-1] + u_2 \cdot A[i, j+1]) + \\ (\beta/2) \cdot (t_1 \cdot A[i+1, j-1] + t_2 \cdot A[i-1, j+1]);$$

Eq. 17

Coefficient pattern 6:

$$Y[i, j] = (\beta/2) \cdot A[i, j] + \\ \alpha \cdot (u_1 \cdot A[i, j-1] + u_2 \cdot A[i, j+1]) + \\ (\beta/2) \cdot (s_1 \cdot A[i-1, j-1] + s_2 \cdot A[i+1, j+1]);$$

Eq. 18

Coefficient pattern 7:

$$Y[i, j] = (\beta/2) \cdot A[i, j] + \\ \alpha \cdot (v_1 \cdot A[i-1, j] + v_2 \cdot A[i+1, j]) + \\ (\beta/2) \cdot ((s_1/2) \cdot A[i-1, j-1] + (s_2/2) \cdot A[i+1, j+1] + \\ (t_1/2) \cdot A[i+1, j-1] + (t_2/2) \cdot A[i-1, j+1]);$$

Eq. 19

Coefficient pattern 8:

$$Y[i, j] = (\beta/2) \cdot A[i, j] + \\ \alpha \cdot (v_1 \cdot A[i-1, j] + v_2 \cdot A[i+1, j]) + \\ (\beta/2) \cdot (t_1 \cdot A[i+1, j-1] + t_2 \cdot A[i-1, j+1]);$$

Eq. 20

Coefficient pattern 9:

$$Y[i, j] = (\beta/2) \cdot A[i, j] + \\ \alpha \cdot (v_1 \cdot A[i-1, j] + v_2 \cdot A[i+1, j]) + \\ (\beta/2) \cdot (s_1 \cdot A[i-1, j-1] + s_2 \cdot A[i+1, j+1]).$$

Eq. 21

In each of the coefficient patterns described above, the color information present at the processing target pixel and the color information present at pixels adjoining the processing target pixel (including the pixels adjoining along the diagonal directions) can be added with weights. The position of the color information to be subjected to the weighted addition and the values of the coefficients are changed in accordance with the differences in similarity. From another point of view, the weighted addition can be performed on the color information in a narrowest range of pixels which contain all the color information corresponding to R, G, and B, three color components by using the coefficients.

Now, when the processing target pixel is on a G position, the luminance component at the processing target pixel can be generated by using a coefficient pattern 10 shown in FIG. 8 (corresponding to the "coefficient pattern different from the at least nine coefficient patterns" as set forth in claims) irrespective of the levels of similarity such as described above. Nevertheless, when the processing target pixel is on a G position, and both the index HV[i−1,j] for indicating the vertical and horizontal similarity and the index DN[i−1,j] for indicating the diagonal similarity at the pixel adjoining the left of the processing target pixel are "0", the generation of the luminance component using the coefficient pattern 10 can sometimes cause a false structure of unpleasant checkered pattern which does not exist in reality. Then, the first embodiment provides an example of performing weighted addition on the color information corresponding to the green component at the processing target pixel and the color information corresponding to a green component lying the closest to the processing target pixel, and applying a low-pass filter to the green component selectively in generating the luminance component so that the occurrence of such a false structure is suppressed.

Specifically, when the image processing unit 11 ascertains from the judgement of S11 in FIG. 4 that the processing target pixel is on a G position, it judges whether or not the index HV[i−1,j] for indicating the vertical and horizontal similarity and the index DN[i−1,j] for indicating the diagonal similarity at the pixel adjoining the left of the processing target pixel are both "0" (S22 in FIG. 5).

When the index HV[i−1,j] for indicating the vertical and horizontal similarity and the index DN[i−1,j] for indicating the diagonal similarity are both "0", the image processing unit 11 then calculates the following Equation 22 to generate a luminance component Y[i,j] by using a coefficient pattern 0 of FIG. 10 in which a low-pass filter is applied to the green component (corresponding to the "coefficient pattern for performing weighted addition on the color information present at a plurality of pixels having the first color component" as set forth in claims) (S23 in FIG. 5):

$$Y[i,j] = \alpha \cdot (d_1 \cdot G[i-1,j-1] + d_2 \cdot G[i,j] + d_3 \cdot G[i-1,j+1]) + (\beta/4) \cdot Z[i-1,j] + Z[i+1,j] + Z[i,j-1] + Z[i,j+1])$$ Eq. 22

Here, in Equation 22, $\alpha$, $\beta$, $d_1$, $d_2$, and $d_3$ are values of not less than zero. The intensity of the low-pass filter can be set by changing the values of $d_1$, $d_2$, and $d_3$ while satisfying the relationship $d_1+d_2+d_3=1$. For example, among possible values of $d_1$, $d_2$, and $d_3$ for applying a strong low-pass filter are "1, 6, and 1". Among possible values of $d_1$, $d_2$, and $d_3$ for applying a weak low-pass filter are "1, 14, and 1".

On the other hand, when at least either one of the index HV[i−1,j] for indicating the vertical and horizontal similarity and the index DN[i−1,j] for indicating the diagonal similarity is not "0" (NO at S22 in FIG. 5), the image processing unit 11 generates a luminance component by using the coefficient pattern 10 (S24 in FIG. 5). That is, the luminance component Y[i,j] is generated through the operation of the following Equation 23:

$$Y[i,j] = \alpha \cdot A[i,j] + (\beta/4) \cdot (A[i-1,j] + A[i+1,j] + A[i,j-1] + A[i,j+1])$$ Eq. 23

Having performed the "luminance-component generation process" as described above to generate a luminance plane, the image processing unit 11 performs an edge enhancement process (corresponding to the "filter processing with predetermined fixed filter coefficients" as set forth in claims) on the luminance plane to correct the luminance plane (S4 in FIG. 3).

<<Example of Processing for Correcting the Luminance Planes>>

For example, the image processing unit 11 performs the edge enhancement process by adding the results of band-pass filtering to the luminance plane by use of a filter containing coefficients of positive and negative values as shown in FIG. 11, to the original luminance plane. That is, the correction of the luminance plane is realized through the operations of the following Equations 24 and 25:

$$YH[i,j] = (8 \cdot Y[i,j] - (Y[i-1,j] + Y[i+1,j] + Y[i,j-1] + Y[i,j+1] + Y[i-1,j-1] + Y[i+1,j-1] + Y[i-1,j+1] + Y[i+1,j+1]))/16.$$ Eq. 24

$$Y[i,j] = Y[i,j] + K \cdot YH[i,j].$$ Eq. 25

Here, in Equation 25, K is a coefficient for changing the intensity of the edge enhancement and is assumed to be a value of the order of 1.

Incidentally, the luminance plane generated thus can be output as a monochrome image.

Next, the image processing unit 11 performs the "chrominance-component generation process" shown in FIG. 6 on the pixels on R positions and pixels on B positions, thereby generating a Cr component of the pixels on the R positions and a Cb component of the pixels on the B positions (S5 in FIG. 3).

In the "chrominance-component generation process" of the first embodiment, a chrominance component is generated by subjecting the color information at a plurality of pixels lying in a local area, out of the Bayer arrayed image data, to weighted addition directly. Incidentally, the color information to be used in such weighted addition and the coefficients of the weighted addition are determined based upon the levels of similarity at the processing target pixel. In the first embodiment, coefficient patterns are provided in advance for performing such a "chrominance-component generation process".

FIGS. 12 and 13 illustrate an example of the coefficient patterns to be used in the chrominance component generation.

Incidentally, as compared to the coefficient patterns shown in FIG. 12, the coefficient patterns shown in FIG. 13 are more effective in suppressing the occurrence of color artifacts.

<<Explanation of Chrominance-Component Generation Process>>

Now, with reference to FIG. 6, the "chrominance-component generation process" will be explained.

Initially, the image processing unit 11 judges what value the index HV[i,j] for indicating the vertical and horizontal similarity at the processing target pixel (pixel on an R position or pixel on a B position) has (S31 in FIG. 6). Then, in accordance with the value of the index HV[i,j] for indicating the vertical and horizontal similarity, the image processing unit 11 generates the chrominance component in the following manner:

For "HV[i,j]=1", the image processing unit 11 generates a chrominance component by using a coefficient pattern 11 (S32 in FIG. 6);

For "HV[i,j]=−1", the image processing unit 11 generates a chrominance component by using a coefficient pattern 12 (S33 in FIG. 6); and For "HV[i,j]=0", the image processing unit 11 generates a chrominance component by using a coefficient pattern 13 (S34 in FIG. 6).

More specifically, when the coefficient patterns shown in FIG. 12 are used, the Cr component Cr[i,j] of the processing target pixel on an R position is generated through the operation of the following Equations 26 through 28, depending on the value of the HV[i,j]. Moreover, when the coefficient patterns shown in FIG. 13 are used, the Cr component Cr[i,j] of the processing target pixel on an R position is generated through the operation of the following Equations 29 through 31, depending on the value of the HV[i,j].

<<In the Case Where Coefficient Patterns Shown in FIG. 12 are Used>>:

$$HV[i,j]=1: Cr[i,j]=Z[i,j]-(G[i,j-1]+G[i,j+1])/2; \quad \text{Eq. 26}$$

$$HV[i,j]=-1: Cr[i,j]=Z[i,j]-(G[i-1,j]+G[i+1,j])/2; \quad \text{Eq. 27}$$

$$HV[i,j]=0: Cr[i,j]=Z[i,j]-(G[i,j-1]+G[i,j+1]+G[i-1,j]+G[i+1,j])/4. \quad \text{Eq. 28}$$

<<In the Case Where Coefficient Patterns Shown in FIG. 13 are Used>>:

$$HV[i,j]=1: Cr[i,j]=(2\cdot Z[i,j]+Z[i,j-2]+Z[i,j+2])/4-(G[i,j-1]+G[i,j+1])/2; \quad \text{Eq. 29}$$

$$HV[i,j]=-1: Cr[i,j]=(2\cdot Z[i,j]+Z[i-2,j]+Z[i+2,j])/4-(G[i-1,j]+G[i+1,j])/2; \quad \text{Eq. 30}$$

$$HV[i,j]=0: Cr[i,j]=(4\cdot Z[i,j]+Z[i,j-2]+Z[i,j+2]+Z[i-2,j]+Z[i+2,j])/8-(G[i,j-1]+G[i,j+1]+G[i-1,j]+G[i+1,j])/4. \quad \text{Eq. 31}$$

Moreover, when the processing target pixel is on a B position, the Cb component Cb[i,j] is generated through Equations 26 to 31 as well.

Having performed the "chrominance-component generation process" as described above over all the pixels on R positions and all the pixels on B positions, the image processing unit 11 interpolates the Cr component and the Cb component for pixels at which the Cr component or Cb component is missing, thereby generating chrominance planes (S6 in FIG. 3). Here, the processing for interpolating the Cr component will be explained while the processing for interpolating the Cb component will be omitted, since the processing for interpolating the Cr component and the processing for interpolating the Cb component can be performed in the same manner.

<<Example of Processing for Interpolating the Cr Component>>

For example, the image processing unit 11 calculates the Cr component for pixels at which the Cr component is missing by averaging the Cr component at a plurality of pixels on R positions lying around the pixel, thereby realizing the interpolation of the Cr component. Specifically, for a pixel on a B position, an interpolation value of the Cr component is obtained through Equation 32 shown below. Moreover, for a pixel on a Gr position, an interpolation value of the Cr component is obtained through Equation 33 shown below. For a pixel on a Gb position, an interpolation value of the Cr component is obtained through Equation 34 shown below.

<<Pixel on B Position>>:

$$Cr[i,j]=(Cr[i-1,j-1]+Cr[i-1,j+1]+Cr[i+1,j-1]+Cr[i+1,j+1])/4; \quad \text{Eq. 32}$$

<<Pixel on Gr Position>>:

$$Cr[i,j]=(Cr[i-1,j]+Cr[i+1,j])/2; \quad \text{Eq. 33}$$

<<Pixel on Gb Position>>:

$$Cr[i,j]=(Cr[i,j-1]+Cr[i,j+1])/2. \quad \text{Eq. 34}$$

By the way, color artifacts attributable to color moire that occurs from a periodic structure of an image can be reduced by applying a low-pass filter along with the interpolating calculation of the Cr component values.

For example, such processing can be achieved by calculating the Cr component for a pixel on an R position through Equation 35 seen below, calculating the Cr component for a pixel on a B position through Equation 36 shown below, calculating an interpolation value of the Cr component for a pixel on a Gr position through Equation 37 shown below, and calculating an interpolation value of the Cr component for a pixel on a Gb position through Equation 38 shown below.

<<Pixel on R Position>>:

$$Cr[i,j] = (36 \cdot Cr[i,j] + 6 \cdot (Cr[i-2,j]+Cr[i+2,j]+Cr[i,j-2]+Cr[i,j+2]) + 1 \cdot (Cr[i-2,j-2]+Cr[i+2,j-2]+Cr[i-2,j+2]+Cr[i+2,j+2]))/64; \quad \text{Eq. 35}$$

<<Pixel on B Position>>:

$$Cr[i,j]=(16\cdot(Cr[i-1,j-1]+Cr[i+1,j-1]+Cr[i-1,j+1]+Cr[i+1,j+1]))/64; \quad \text{Eq. 36}$$

<<Pixel on Gr Position>>:

$$Cr[i,j]=(24\cdot(Cr[i-1,j]+Cr[i+1,j]) + 4\cdot(Cr[i-1,j-2]+Cr[i+1,j-2]+Cr[i-1,j+2]+Cr[i+1,j+2]))/64; \quad \text{Eq. 37}$$

<<Pixel on Gb position>>:

$$Cr[i,j]=(24\cdot(Cr[i,j-1]+Cr[i,j+1]) + 4\cdot(Cr[i-2,j-1]+Cr[i+2,j-1]+Cr[i-2,j+1]+Cr[i+2,j+1]))/64. \quad \text{Eq. 38}$$

It is to be noted that if the Cr component at the pixels on G positions and the Cr component at the pixels on B positions are initialized to "0", the operation of Equations 32 through 34 can be achieved by applying such a filter as shown in FIG. 14, and the operation of Equations 35 through 38 can be achieved by applying such a filter as shown in FIG. 15.

In the manner described above, the Cr component and Cb component are interpolated to generate the chrominance planes, which can be output as a YCbCr color image. If necessary, the image processing unit 11 performs a colorimetric system conversion process on the luminance plane and the chrominance planes to generate RGB planes (S7 in FIG. 3).

<<Example of Processing for Generating RGB Planes>>

Through the colorimetric system conversion process, the image processing unit 11 achieves the generation of RGB planes, for example, by performing the operation of Equations 39 through 41 shown below:

$$R[i,j]=Y[i,j]+(1-\beta/2)\cdot Cr[i,j]-(\beta/2)\cdot Cb[i,j], \qquad \text{Eq. 39}$$

$$G[i,j]=Y[i,j]-(\beta/2)\cdot Cr[i,j]-(\beta/2)\cdot Cb[i,j], \qquad \text{Eq. 40}$$

$$B[i,j]=Y[i,j]-(\beta/2)\cdot Cr[i,j]+(1-\beta/2)\cdot Cb[i,j]. \qquad \text{Eq. 41}$$

Figure 16:
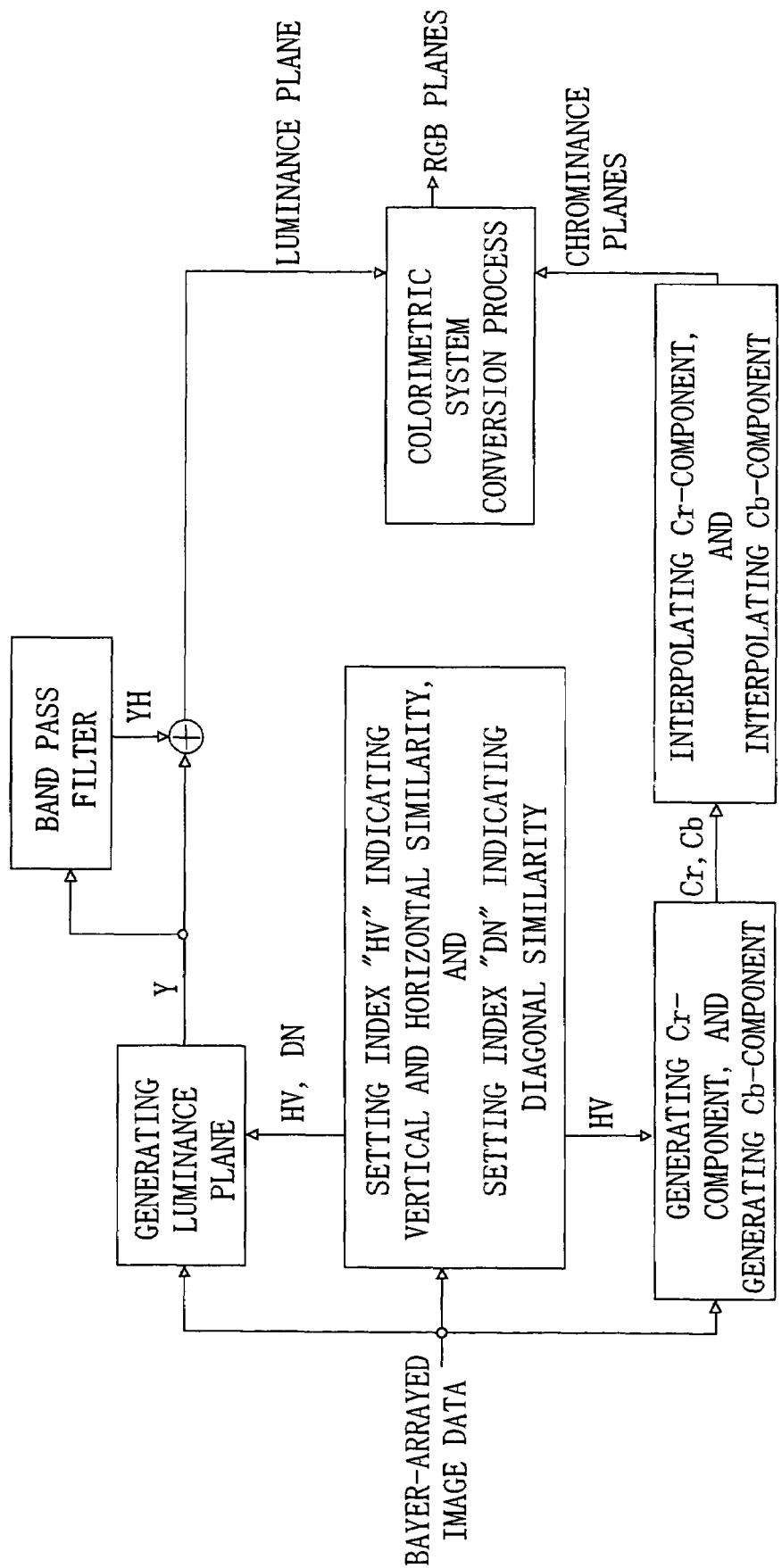
FIG. 16 is a diagram showing the flow of data in the first embodiment.

FIG. 16 is a diagram showing the flow of data according to the first embodiment.

In the first embodiment, the luminance component at pixels on R positions and that at pixels on B positions are generated by using coefficient patterns that are selected from among the nine coefficient patterns depending on the similarity. It is therefore possible to generate an extremely smooth luminance plane even on fine edges.

Moreover, in the first embodiment, weighted addition can be achieved using the color information corresponding to the R, G, and B, three color components at the processing target pixel and pixels adjoining the processing target pixel in a narrowest range, taking into consideration the similarity along various directions. This gives excellent suitability for the "luminance-component generation process" on Bayer arrayed image data, allowing the generation of a smooth luminance plane.

Besides, in the first embodiment, coefficient patterns that are set so that a luminance component contains R, G, and B in constant ratios are used through the "luminance-component generation process". Consequently, it is possible to prevent a nonexistent structure in the photographic object (a structure attributable to the Bayer array) from appearing as a structure that varies pixel by pixel. It is therefore possible to generate a luminance plane with higher precision than the conventional art in which the ratios of R, G, and B constituting a luminance value have been uneven pixel by pixel.

Moreover, in the first embodiment, the luminance plane that carries fine structures is subjected to the edge enhancement process to correct the high frequency components. It is therefore possible to obtain a luminance plane with higher resolution than the conventional art in which the correction of high frequency components has been insufficient.

Furthermore, in the first embodiment, since the chrominance planes are generated directly from the Bayer arrayed image data independently of the luminance plane, they will not be affected by the frequency characteristics of the luminance plane, which might cause the occurrence of color artifacts, unlike in the conventional art where the "chrominance values" have been generated with reference to luminance values. It is therefore possible to generate the chrominance planes with high precision.

Besides, as is evident from FIG. 16, in the first embodiment, the indexes for indicating similarity are obtained directly from the Bayer arrayed image data. The first embodiment thus differs from the conventional art where the directions of similarity at individual pixels have been classified with reference to "blurred luminance values" whose high frequency components as to structural factors are all broken. In the first embodiment, the similarity is determined by using the Bayer arrayed image data directly. It is therefore possible to generate a luminance plane with a high resolution in areas of fine structures.

As has been described, according to the first embodiment, image enhancement is achieved with high precision.

Moreover, in the first embodiment, the similarity is taken into account in generating the luminance plane. The correction of high frequency components can thus be achieved by a band pass filter with fixed coefficients. This eliminates the need for the correction using different correction values in accordance with the directions of similarity at respective pixels, which has been exercised in the conventional art, and can reduce the reference planes used in the correction processing. Consequently, when the generation of the luminance plane is realized by hardware, the hardware structure can be more simplified than in the conventional art.

Incidentally, in the first embodiment, the Cr component and the Cb component are interpolated to generate the chrominance planes at S6 in FIG. 3. Such chrominance planes may be subjected to correction processing for reducing the occurrence of color artifacts further (such as processing of applying a median filter).

DESCRIPTION OF SECOND EMBODIMENT

Hereinafter, description will be given of an operation of the second embodiment.

Differences between the second embodiment and the first embodiment consist in that the second embodiment does not require the setting of the index DN for indicating diagonal similarity (the processing corresponding to S2 in FIG. 3) which has been exercised in the first embodiment, and that the "luminance-component generation process" is different.

Then, in the second embodiment, description will be given of the "luminance-component generation process". Description of the rest of the operation will be omitted.

FIG. 17 is an operation flowchart of the image processing unit 11 according to the second embodiment, showing the operation of the "luminance-component generation process" in particular.

<<Explanation of Luminance-Component Generation Process>>

Hereinafter, the "luminance-component generation process" will be explained with reference to FIG. 17.

Note that, in the "luminance-component generation process" of the second embodiment, a luminance component is generated by subjecting the color information at a plurality of pixels lying in a local area, out of the Bayer arrayed image data, to weighted addition as in the first embodiment. To perform such a "luminance-component generation process", the coefficient patterns 1, 4, 7, and 10 out of the coefficient patterns shown in FIG. 8 and the coefficient pattern 0 shown in FIG. 9 are prepared in advance.

Initially, as in the first embodiment, the image processing unit 11 judges whether or not the processing target pixel is on a G position (S41 in FIG. 17). When the processing target pixel is not on a G position (NO at S41 in FIG. 17), the image processing unit 11 judges what value the index HV[i,j] for indicating the vertical and horizontal similarity of the processing target pixel has (S42 in FIG. 17). Then, depending on the value of the index HV[i,j] for indicating the vertical and horizontal similarity, the image processing unit 11 generates a luminance component in the following manner.

For "HV[i,j]=0", the image processing unit 11 generates a luminance component by using the coefficient pattern 1 (S43 in FIG. 17). That is, the luminance component Y[i,j] is generated through the operation of Equation 13 in the first embodiment.

For "HV[i,j]=1", the image processing unit 11 generates a luminance component by using the coefficient pattern 4

(S44 in FIG. 17). That is, the luminance component Y[i,j] is generated through the operation of Equation 16 in the first embodiment.

For "HV[i,j]=−1", the image processing unit 11 generates a luminance component by using the coefficient pattern 7 (S45 in FIG. 17). That is, the luminance component Y[i,j] is generated through the operation of Equation 19 in the first embodiment.

Now, when the processing target pixel is on a G position, the image processing unit 11 judges whether or not the index HV[i−1,j] for indicating the vertical and horizontal similarity at the pixel adjoining the left of the processing target pixel is "0" (S46 in FIG. 17).

Then, when the index HV[i−1,j] for indicating the vertical and horizontal similarity is "0", the image processing unit 11 generates a luminance component Y[i,j] by using the coefficient pattern 0 as in the first embodiment (S47 in FIG. 17). That is, the luminance component Y[i,j] is generated through the operation of Equation 22 in the first embodiment.

On the other hand, when the index HV[i−1,j] for indicating the vertical and horizontal similarity is not "0", the image processing unit 11 generates a luminance component by using the coefficient pattern 10 as in the first embodiment (S48 in FIG. 17). That is, the luminance component Y[i,j] is generated through the operation of Equation 23 in the first embodiment.

As has been described, the second embodiment omits the setting of the index DN for indicating diagonal similarity which has been exercised in the first embodiment. The number of coefficient patterns is thus reduced from in the first embodiment.

Consequently, according to the second embodiment, an extremely smooth luminance plane even on fine edges along various directions, though somewhat inferior to the first embodiment, can be generated through a procedure simpler than in the first embodiment, thereby achieving image enhancement with high precision.

Incidentally, in the luminance-component generation processes of the first and second embodiments, different coefficient patterns are provided for applying a low-pass filter selectively in accordance with the directional similarity at the pixel adjoining a processing target pixel on the left, when the processing target pixel is on a G position. In an ordinary image restoration process alone, however, a luminance component of the processing target pixel on a G position may be generated by using the coefficient pattern 1 alone irrespective of such directional similarity. That is, in the first embodiment, the processing of S24 in FIG. 5 may be exclusively performed instead of the processing of S22 through S24 in FIG. 5. Moreover, in the second embodiment, the processing of S48 in FIG. 17 may be exclusively performed instead of the processing of S46 through S48 in FIG. 17.

THIRD EMBODIMENT

Hereinafter, description will be given of an operation of the third embodiment.

In the third embodiment, image processing is performed on the PC 18 shown in FIG. 1.

Here, an image processing program recorded on the CD-ROM 28 or other recording medium (an image processing program for performing an image restoration process as the image processing unit 11 in any of the foregoing embodiments does) is installed on the PC 18 in advance. That is, a not-shown hard disk in the PC 18 contains such an image processing program as executable on a not-shown CPU.

Hereinafter, the operation of the third embodiment will be described with reference to FIG. 1.

Initially, when a photographing mode is selected and a shutter release button is pressed by an operator through the operation unit 24, the electronic camera 1 digitizes image signals that are generated in the image sensor 21 and given predetermined analog signal processing in the analog signal processing unit 22, with the A/D conversion unit 10 and supplies them to the image processing unit 11 as image data. The image processing unit 11 performs such image processing as tone conversion and gamma correction on the image data supplied thus. The image data of which such image processing is completed are recorded on the memory card 16 via the memory card interface unit 17.

Next, in a state where a PC communication mode is selected by the operator through the operation unit 24, the transfer of image data is instructed from the PC 18 via the external interface unit 19. Then, the electronic camera 1 reads the image data corresponding to the instruction from the memory card 16 through the memory card interface unit 17. Then, the image data read thus is supplied to the PC 18 through the external interface unit 19.

The not-shown CPU in the PC 18, when supplied with the image data in this way, executes the image processing program mentioned above. Incidentally, image data given the image restoration process through the execution of such image processing program may be recorded on the not-shown hard disk, or may be converted into a colorimetric system adopted in the monitor 26 or the printer 27 if needed.

As has been described, according to the third embodiment, the same image restoration process as in any of the foregoing embodiments can be performed by the PC 18, so that image enhancement is achieved with high precision.

Incidentally, when a memory card 16 having image data recorded thereon as described previously is loaded, the not-shown CPU in the PC 18 may read the image data from the memory card 16 and execute the foregoing image processing program.

Moreover, such an image processing program may be downloaded to the PC 18 through access to a predetermined Web site on the Internet.

Besides, such an image processing program may be executed by a remote server or the like connected to the Internet or the like, not by the PC 18. That is, the PC 18 has only to transfer the image data supplied from the electronic camera 1, to a server or the like capable of executing the foregoing image processing program over the Internet or the like. Then, the image data can be subjected to the same image restoration processing as in any of the foregoing embodiments.

Each of the foregoing embodiments has dealt with the processing on an image that is expressed in the RGB colorimetric system and each pixel thereof contains the color information corresponding to any single color component among R, G, and B. The same processing can also be applied, however, to images that are expressed in other colorimetric systems.

Furthermore, each of the foregoing embodiments has dealt with the case where the processing is targeted on the image data that has color components patterned as shown in FIG. 2. Nevertheless, the patterns of image data to which the present invention is applicable are not limited to those shown in FIG. 2.

INDUSTRIAL APPLICABILITY

According to the image processing apparatus of the present invention, it is possible to achieve a high-precision enhancement of an image that is expressed in a plurality of color components and consists of a plurality of pixels each having color information corresponding to one of the color components.

In addition, according to the image processing program of the present invention, it is possible to achieve, by using a computer, a high-precision enhancement of an image that is expressed in a plurality of color components and consists of a plurality of pixels each having color information corresponding to one of the color components.

What is claimed is:

1. An image processing apparatus comprising
an image processing unit for receiving a first image, performing weighted addition of color information in said first image to generate a color component different from that of the color information in said first image, and outputting the generated color component as a second image, said first image being expressed in a plurality of color components and comprising a plurality of pixels each having color information corresponding to one of the color components in a specific manner, wherein:
in said image processing unit, at least nine coefficient patterns consisting of values of not less than zero are prepared, and any one of said coefficient patterns is used for the weighted addition.

2. The image processing apparatus according to claim 1, wherein:
in said image processing unit, levels of similarity along a plurality of directions are determined, and which to use from said at least nine coefficient patterns is selected in accordance with the determined result.

3. The image processing apparatus according to claim 1, wherein:
in said image processing unit, at least nine coefficient patterns are prepared for performing weighted addition on color information present at a target pixel in said first image and color information present at pixels adjoining said target pixel.

4. The image processing apparatus according to claim 1, wherein:
in said image processing unit, when said first image is expressed in a first color component set with a higher pixel density and second and third color components set with a lower pixel density, weighted addition on a pixel having said first color component is performed by using a coefficient pattern prepared separately from said at least nine coefficient patterns.

5. The image processing apparatus according to claim 4, wherein:
in said image processing unit, levels of similarity along a plurality of directions are determined, for a pixel having said second or third color component and adjacent to pixels having said first color component, and when the levels of similarity are indistinguishable along any direction, a coefficient pattern including weighted addition on color information present at a plurality of pixels having the first color component is used as said coefficient pattern prepared separately.

6. The image processing apparatus according to claim 5, wherein:
in said image processing unit, at the time of the weighted addition, a coefficient pattern including weighted addition of color information present at a target pixel and color information present at the pixels having said first color component and lying the closest to said target pixel is used, as said coefficient pattern including the weighted addition on the color information present at the plurality of pixels having the first color component.

7. An image processing apparatus comprising
an image processing unit for receiving a first image, performing weighted addition of color information in said first image by using variable coefficients of not less than zero to generate a color component different from that of the color information in said first image, and outputting the generated color component as a second image, said first image being expressed in a plurality of color components and comprising a plurality of pixels each having color information corresponding to one of the color components in a specific manner, wherein:
in said image processing unit, weighted addition of color information present at a target pixel in said first image and color information present at pixels adjoining said target pixel is performed.

8. The image processing apparatus according to claim 7, wherein:
in said image processing unit, levels of similarity along a plurality of directions are determined, and said coefficients of the weighted addition are changed in accordance with the determined result.

9. An image processing apparatus comprising
an image processing unit for receiving a first image, performing weighted addition of color information in said first image by using variable coefficients of not less than zero to generate a color component different from that of the color information in said first image, and outputting the generated color component as a second image, said first image being expressed in three or more types of color components and comprising a plurality of pixels each having color information corresponding to one of the color components in a specific manner, wherein:
in said image processing unit, weighted addition of color information corresponding to at least three types of color components in said first image is performed over all the pixels in said first image.

10. The image processing apparatus according to claim 9, wherein:
in said image processing unit, levels of similarity along a plurality of directions are determined, and said coefficients of the weighted addition are changed in accordance with the determined result.

11. The image processing apparatus according to claim 9, wherein:
in said image processing unit, weighted addition on color information present at pixels in a narrowest range around a target pixel in said first image is performed, said narrowest range including the color information corresponding to said at least three types of color components.

12. An image processing apparatus comprising
an image processing unit for receiving a first image, performing weighted addition of color information in said first image by using variable coefficients of not less than zero to generate a color component different from that of the color information in said first image, and outputting the generated color component as a second image, said first image being expressed in a plurality of color components and comprising a plurality of pixels each having color information corresponding to one of the color components in a specific manner, wherein:

in said image processing unit, weighted addition of the color information in said first image in constant color-component ratios is performed over all the pixels in said first image.

13. The image processing apparatus according to claim 12, wherein:

in said image processing unit, levels of similarity along a plurality of directions are determined, and said coefficients of the weighted addition are changed in accordance with the determined result.

14. The image processing apparatus according to claim 12, wherein:

in said image processing unit, when said first image is expressed in a first color component set with a higher pixel density and second and third color components set with a lower pixel density, weighted addition of color information corresponding to said second color component and color information corresponding to said third color component is performed at an identical color-component ratio.

15. An image processing apparatus comprising an image processing unit for receiving a first image, performing weighted addition of color information in said first image by using variable coefficients of not less than zero to generate a color component different from that of the color information in said first image, performing filter processing with predetermined fixed filter coefficients to correct said color component different from that of the color information in said first image, and outputting the generated color component as a second image, said first image being expressed in a plurality of color components and comprising a plurality of pixels each having color information corresponding to one of the color components in a specific manner.

16. The image processing apparatus according to claim 15, wherein:

in said image processing unit, levels of similarity along a plurality of directions are determined, and said coefficients of the weighted addition are changed in accordance with the determined result.

17. The image processing apparatus according to claim 15, wherein:

in said image processing unit, filter coefficients including positive and negative values are used as said predetermined fixed filter coefficients.

18. An image processing apparatus comprising an image processing unit for receiving a first image, generating a luminance component different from color information in said first image at the same pixel positions as in the first image by using the color information in said first image, generating a chrominance component different from the color information in said first image at the same pixel positions as in the first image separately from said luminance component, and outputting said luminance component and said chrominance component as a second image, said first image being expressed in a plurality of color components and comprising a plurality of pixels each having color information corresponding to one of the color components in a specific manner, wherein:

in said image processing unit, weighted addition of color information in said first image is performed by using variable coefficients of not less than zero to generate said luminance component.

19. An image processing apparatus comprising an image processing unit for receiving a first image, generating a luminance component different from color information in said first image at all of the same pixel positions as in the first image by using the color information in said first image, generating a chrominance component different from the color information in said first image at the same pixel positions as in the first image separately from said luminance component, and outputting said luminance component and said chrominance component as a second image, said first image being expressed in a plurality of color components and comprising a plurality of pixels each having color information corresponding to one of the color components in a specific manner.

20. The image processing apparatus according to claim 18, wherein:

in said image processing unit, levels of similarity along a plurality of directions are determined, and said luminance component is generated by performing weighted addition of the color information in said first image in accordance with the determined result.

21. The image processing apparatus according to claim 18, wherein:

in said image processing unit, levels of similarity along a plurality of directions are determined, and said chrominance component is generated by performing weighted addition of the color information in said first image in accordance with the determined result.

22. The image processing apparatus according to claim 20, wherein:

in said image processing unit, when said first image is expressed in a first color component, a second color component, and a third color component, similarity factors along a plurality of directions are calculated by using at least one similarity factor component out of:

a first similarity factor component consisting of said first color component and said second color component;

a second similarity factor component consisting of said second color component and said third color component;

a third similarity factor component consisting of said third color component and said first color component;

a fourth similarity factor component consisting of said first color component alone;

a fifth similarity factor component consisting of said second color component alone; and a sixth similarity factor component consisting of said third color component alone, and the levels of similarity along said plurality of directions are determined based on said similarity factors.

23. The image processing apparatus according to claim 1, wherein:

in said image processing unit, said color component of said second image is outputted in association with the same pixel positions as in said first image.

24. The image processing apparatus according to claim 1, wherein:

in said image processing unit, a luminance component is generated as a color component different from that of the color information in said first image.

25. A computer readable medium storing an image processing program for outputting a color component for enhancing an image, the image processing program comprising instructions which, when executed on a computer, cause the computer to execute:

an image processing step for receiving a first image, a step of performing weighted addition of color information in said first image to generate a color component different from that of the color information in said first image, and a step of outputting the generated color component as a second image, said first image being expressed in a plurality of color components and comprising a plurality of pixels each having color information corresponding to one of the color components in a specific manner, wherein:

in said image processing step, at least nine coefficient patterns consisting of values of not less than zero are prepared, and any one of said coefficient patterns is used for the weighted addition.

26. A computer readable medium storing an image processing program for outputting a color component for enhancing an image, the image processing program comprising instructions which, when executed on a computer, cause the computer to execute:

an image processing step for receiving a first image, a step of performing weighted addition of color information in said first image by using variable coefficients of not less than zero to generate a color component different from that of the color information in said first image, and a step of outputting the generated color component as a second image, said first image being expressed in a plurality of color components and comprising a plurality of pixels each having color information corresponding to one of the color components in a specific manner, wherein:

in said image processing step, weighted addition of color information present at a target pixel in said first image and color information present at pixels adjoining said target pixel is performed.

27. A computer readable medium storing an image processing program for outputting a color component for enhancing an image, the image processing program comprising instructions which, when executed on a computer, cause the computer to execute:

an image processing step for receiving a first image, a step of performing weighted addition of color information in said first image by using variable coefficients of not less than zero to generate a color component different from that of the color information in said first image, and a step of outputting the generated color component as a second image, said first image being expressed in three or more types of color components and comprising a plurality of pixels each having color information corresponding to one of the color components in a specific manner, wherein:

in said image processing step, weighted addition of color information corresponding to at least three types of color components of said first image is performed over all the pixels in said first image.

28. A computer readable medium storing an image processing program for outputting a color component for enhancing an image, the image processing program comprising instructions which, when executed on a computer, cause the computer to execute:

an image processing step for receiving a first image, a step of performing weighted addition of color information in said first image by using variable coefficients of not less than zero to generate a color component different from that of the color information in said first image, and a step of outputting the generated color component as a second image, said first image being expressed in a plurality of color components and comprising a plurality of pixels each having color information corresponding to one of the color components in a specific manner, wherein:

in said image processing step, weighted addition of the color information in said first image is performed in constant color-component ratios over all the pixels in said first image.

29. A computer readable medium storing an image processing program for outputting a color component for enhancing an image, the image processing program comprising instructions which, when executed on a computer, cause the computer to execute:

an image processing step for receiving a first image, a step of performing weighted addition of color information in said first image by using variable coefficients of not less than zero to generate a color component different from that of the color information in said first image, a step of performing filter processing with predetermined fixed filter coefficients to correct said color component different from that of the color information in said first image, and a step of outputting the generated color component as a second image, said first image being expressed in a plurality of color components and comprising a plurality of pixels each having color information corresponding to one of the color components in a specific manner.

30. A computer readable medium storing an image processing program for outputting a luminance component and a chrominance component for enhancing an image, the image processing program comprising instructions which, when executed on a computer, cause the computer to execute:

an image processing step for receiving a first image, a step of generating a luminance component different from color information in said first image at the same pixel positions as in the first image by using the color information in said first image, a step of generating a chrominance component different from the color information in said first image at the same pixel positions as in the first image separately from said luminance component, and a step of outputting said luminance component and said chrominance component as a second image, said first image being expressed in a plurality of color components and comprising a plurality of pixels each having color information corresponding to one of the color components in a specific manner, wherein:

in said image processing step, weighted addition of color information in said first image is performed by using variable coefficients of not less than zero to generate said luminance component.

31. A computer readable medium storing an image processing program for outputting a luminance component and a chrominance component for enhancing an image, the image processing program comprising instructions which, when executed on a computer, cause the computer to execute:

an image processing step for receiving a first image, a step of generating a luminance component different from color information in said first image at all of the same pixel positions as in the first image by using the color information in said first image, a step of generating a chrominance component different from the color information in said first image at the same pixel positions as in the first image separately from said luminance component, and a step of outputting said luminance component and said chrominance component as a second image, said first image being expressed in a plurality of color components and comprising a plurality of pixels each having color information corresponding to one of the color components in a specific manner.

32. The image processing apparatus according to claim 7, wherein:

in said image processing unit, said color component of said second image is outputted in association with the same pixel positions as in said first image.

33. The image processing apparatus according to claim 9, wherein:

in said image processing unit, said color component of said second image is outputted in association with the same pixel positions as in said first image.

34. The image processing apparatus according to claim 12, wherein:

in said image processing unit, said color component of said second image is outputted in association with the same pixel positions as in said first image.

35. The image processing apparatus according to claim 15, wherein:

in said image processing unit, said color component of said second image is outputted in association with the same pixel positions as in said first image.

36. The image processing apparatus according to claim 19, wherein:

in said image processing unit, levels of similarity along a plurality of directions are determined, and said luminance component is generated by performing weighted addition of the color information in said first image in accordance with the determined result.

37. The image processing apparatus according to claim 36, wherein:

in said image processing unit, when said first image is expressed in a first color component, a second color component, and a third color component, similarity factors along a plurality of directions are calculated by using at least one similarity factor component out of:

a first similarity factor component consisting of said first color component and said second color component;

a second similarity factor component consisting of said second color component and said third color component;

a third similarity factor component consisting of said third color component and said first color component;

a fourth similarity factor component consisting of said first color component alone;

a fifth similarity factor component consisting of said second color component alone; and a sixth similarity factor component consisting of said third color component alone, and the levels of similarity along said plurality of directions are determined based on said similarity factors.

38. The image processing apparatus according to claim 19, wherein:

in said image processing unit, levels of similarity along a plurality of directions are determined, and said chrominance component is generated by performing weighted addition of the color information in said first image in accordance with the determined result.

* * * * *